United States Patent
Chou et al.

[11] Patent Number: 5,917,616
[45] Date of Patent: Jun. 29, 1999

[54] IMAGE PROCESSING APPARATUS AND CONTROL METHOD THEREOF

[75] Inventors: Fusang Chou, Kowloon, The Hong Kong Special Administrative Region of the People's Republic of China; Izuru Horiuchi, Toride, Japan; Saijiro Endo, Tokyo, Japan; Koji Okabe, Yokohama, Japan

[73] Assignee: Canon Kabushiki Kaisha, Tokyo, Japan

[21] Appl. No.: 08/721,763

[22] Filed: Sep. 30, 1996

[30] Foreign Application Priority Data

Sep. 29, 1995 [JP] Japan .................................. 7-253332
Feb. 22, 1996 [JP] Japan .................................. 8-034890

[51] Int. Cl.$^6$ .............................. H04N 1/46; H04N 1/40; H04N 1/04
[52] U.S. Cl. .......................... 358/488; 358/488; 358/448; 358/497; 358/498
[58] Field of Search .................................... 358/488, 468, 358/496, 497, 498, 437, 448

[56] References Cited

U.S. PATENT DOCUMENTS 5,119,213  6/1992  Graves et al. .......................... 358/488
5,266,996  11/1993  Wakamiya et al. ..................... 358/437
5,510,908  4/1996  Watanabe et al. ...................... 358/448

*Primary Examiner*—Edward L. Coles
*Assistant Examiner*—Twyler Lamb
*Attorney, Agent, or Firm*—Fitzpatrick, Cella, Harper & Scinto

[57] ABSTRACT

The present invention provides a multi-function apparatus comprises a pressure plate for pressing an original placed on an original support plate, a read means for reading an image of the original on the original support plate, a reception means for receiving data representing an image, a record means for recording images based on the image read by the read means and the data received by the reception means, a detection means for detecting open/close of the pressure plate, a changeover means for changing a first mode and a second mode, the first mode being to record by using the record means the image based on the image read by the read means, and the second mode being to record by using the record means the image based on the data received by the reception means, wherein the changeover means changes, in a case where the data is received by the reception means during the first mode is being set, the mode to the second mode if a predetermined period of time is elapsed from the detection by the detection means that the pressure plate was closed, whereby the efficiency of a copy function process can be improved in the multi-function apparatus.

49 Claims, 22 Drawing Sheets

IMAGE PROCESSING APPARATUS AND CONTROL METHOD THEREOF

BACKGROUND OF THE INVENTION

1. Field of the Invention

The Present invention relates to an image processing apparatus capable of performing a plurality of function processes such as a copy function, a print function, a facsimile function and the like, and to a method for controlling such the image processing apparatus.

2. Related Background Art

In recent years, a digital copy machine to which a facsimile communication function is added is well known. Such an apparatus uses both a scanner and a printer, and further has a copy mode for performing a process by a copy function and a facsimile mode for performing a process by a facsimile function. The apparatus performs the respective processes by appropriately changing or switching the copy mode and the facsimile mode.

For example, when the copy mode has been set as an initial mode (i.e., a mode to which a current mode returns when a power source is turned on and when the apparatus is not managed for a predetermined period of time), the apparatus ordinarily stands by in the copy mode. However, if a facsimile communication is received, the mode is automatically changed to the facsimile mode and then the apparatus starts to print out received image data. In this case, if the apparatus is operating in the copy mode, the mode is not changed to the facsimile mode, and the received image data is once stored in a memory. Then, the mode is changed to the facsimile mode after the operation in the copy mode terminates, such that the received image data stored in the memory is read out to be printed out. Further, when a facsimile transmission is to be performed, the mode is changed to the facsimile mode by a key operation and then the operation for transmission is performed.

However, conventionally, when the facsimile communication is received if the apparatus is not operating in the copy mode, the mode is changed to the facsimile mode and then the apparatus starts to print out the received image data. That is, for example, when an operator intends to start a copy operation by setting an original or is changing the original, the apparatus itself does not yet operate. Therefore, the apparatus starts to print out the received image data, so that the operator who intends to perform the copy operation must wait to start the operation until the apparatus terminates such a print operation.

FIG. 22 is a perspective view showing an outer construction of the conventional digital copy machine.

In the drawing, a reference numeral 100 denotes a copy machine (main body) which has the copy function and the facsimile function. A reference numeral 1 denotes an original pressure plate (to be referred to as a pressure plate hereinafter) which is used to fix the original. A reference numeral 4 denotes a console unit which is composed of a copy start key 2, a message display 3, a one-touch dial key 8, numeral keys 9 and the like. The copy start key 2 is used to start a copy of the original.

The message display 3 displays various function to be set or various messages concerning the main body 100. The one-touch dial key 8 is capable of performing a one-touch input of a destination of facsimile communication, and the numeral keys 9 input numerals such as the number of copies and the like. A reference numeral 109 denotes a paper discharge tray which is used to discharge copy output papers, and a reference numeral 110 denotes a paper discharge tray which is used to discharge facsimile output papers or printer output papers.

FIG. 23 is a flow chart for explaining an image output control procedure of the digital copy machine shown in FIG. 22. In the drawing, reference numerals S2301 to S2311 denote respective steps.

When a power is turned on in the main body 100, it is judged in the step S2301 whether or not an image output signal of a facsimile (FAX) is present. If it is judged that the image output signal of the FAX is present, the flow advances to the step S2304 to perform an image output of the FAX. Then, it is judged in the step S2305 whether or not the image output of the FAX terminates, and the flow returns to the step S2301 again if it is judged that the image output terminates.

On the other hand, if it is judged in the step S2301 that the image output signal of the FAX is not present, the copy mode is set as a stand-by mode (COPY MODE STAND-BY) in the step S2302.

Then, in the state that the main body 100 is in a stand-by state in the copy mode (COPY MODE STAND-BY), it is judged in the step S2303 whether or not the copy start key 2 is depressed (START instruction). If it is judged that the copy start key 2 is depressed, the image output is performed in the same manner as above.

On the other hand, if the copy start key is not depressed in the step S2303, the main body 100 which was in the stand-by state in the copy mode (COPY MODE STAND-BY) comes to be in a stand-by state for waiting a mode change instruction. Then, it is judged in the step S2306 whether or not a function mode was changed to a FAX mode. If it is judged that the mode was changed to the FAX mode, in the step S2307, the main body 100 comes to be in the stand-by state in the FAX mode (FAX MODE STAND-BY).

After then, in the state that the main body 100 is in the stand-by state in the FAX mode (FAX MODE STAND-BY), it is judged in the step S2308 whether or not a FAX start key is depressed within a predetermined period of time. If it is judged there is no input by the FAX start key, the flow returns to the step S2309 to be again in an initial state.

On the other hand, if it is judged in the step S2311 that the FAX start key is depressed within the predetermined period of time (START), a FAX transmission is performed in the step S2309. Then, after it is judged in the step S2310 that the FAX transmission terminates, the flow again returns to the initial-state step S2301.

As explained above, the main body 100 shown in FIG. 22 is controlled to be automatically in the stand-by state in the copy mode when there is no output signal of the facsimile or the printer.

However, if the copy start key 2 is not depressed by the user in the step S2303 of FIG. 23, when an another image output signal (e.g., FAX) is received, the copy mode is immediately changed to an another function mode (e.g., FAX mode) in the step S2306, whereby an output in such the FAX function is performed.

Therefore, for example, in the copy process, an another function process starts by an image output based on the another image output signal, in the midst of the operation that the operator sets the original or immediately before the operator depresses the copy start key 2. Thus, the copy function cannot start until such the image output terminates. As a result, there is a problem that efficiency of the copy function process in a multi-process function is seriously degraded.

Further, in a case where a FAX transmission preparation (e.g., a sequential processes such as an input of a partner's telephone number, a selection of a partner whose telephone number has been registered, and the like) terminates but the mode of the main body 100 is not yet changed from the copy mode to the FAX mode, if a mode change to an another mode is requested, the setting of the telephone number, the mode and the like which were input for the FAX transmission are cleared and the main body comes to be in the initial state, so that the preparation is wasted. In other words, there is a problem that input operations for the telephone number and the like are again compelled after the mode change to the FAX mode and thus FAX function process efficiency in the multi-process function is seriously degraded.

SUMMARY OF THE INVENTION

An object of the present invention is to provide an image processing apparatus and a control method thereof which eliminate the above-mentioned problems.

An another object of the present invention is to provide an image processing apparatus and a control method thereof which can easily cope with a concurrence of processes.

A still another object of the present invention is to provide an image processing apparatus and a control method thereof which do not interrupt work of an operator who is carrying out a copy operation.

A still another object of the present invention is to provide an image processing apparatus and a control method thereof which reduce an operator's load such as a mode resetting and the like.

The above and other objects of the present invention will be apparent from the following detailed description in conjunction with the attached drawings.

DETAILED DESCRIPTION OF THE PREFERRED EMBODIMENTS

First Embodiment

Figure 1:
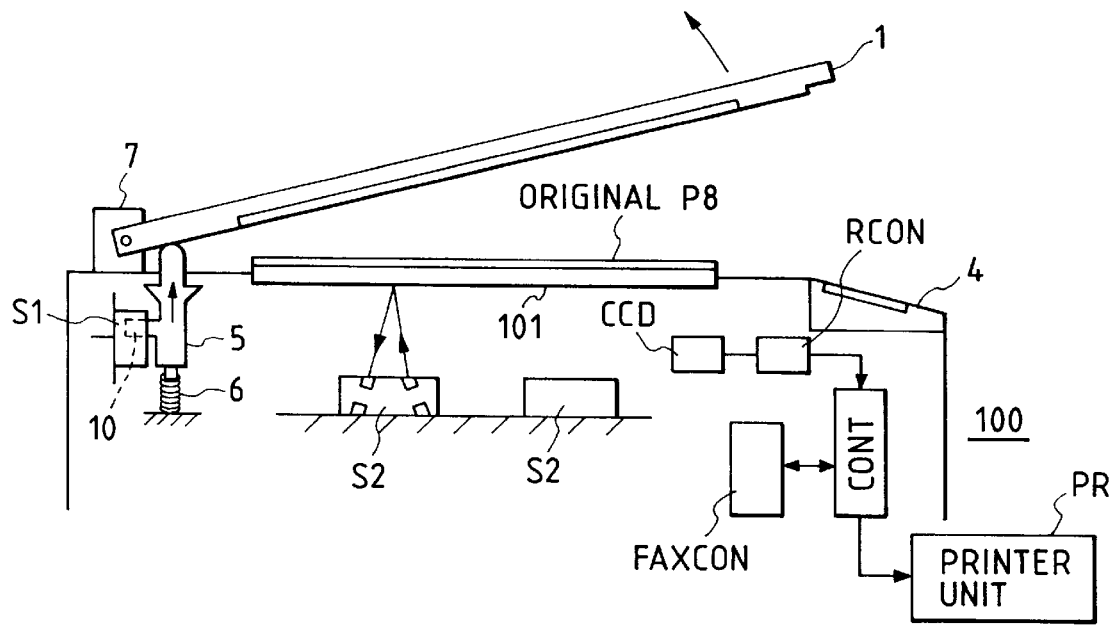
FIG. 1 is a schematic sectional view for explaining a main construction of a multi-function apparatus according to first and fourth embodiments of the present invention.
Figure 22:
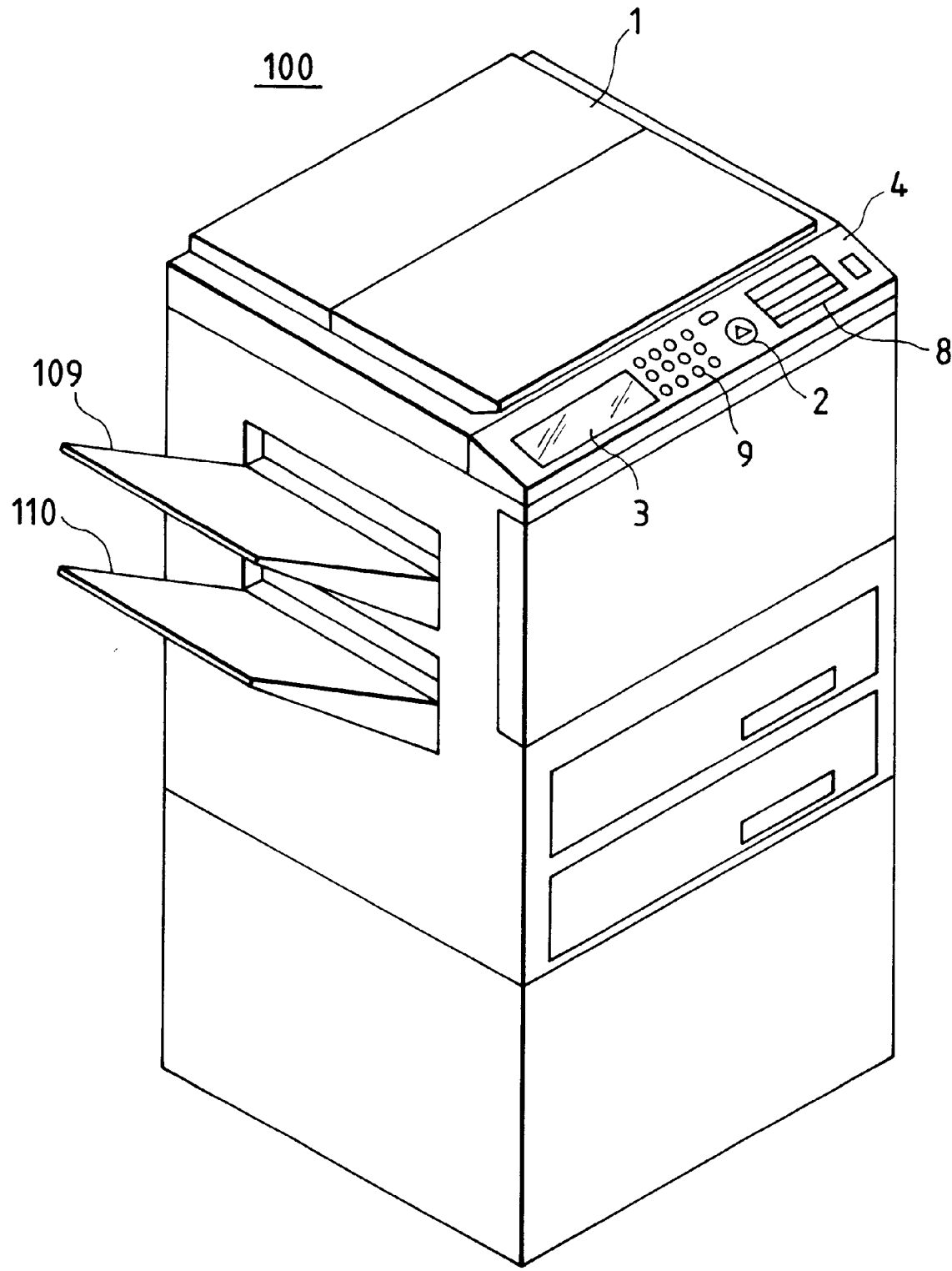
FIG. 22 is a perspective view showing an outer construction of a conventional multi-function apparatus.
Figure 23:
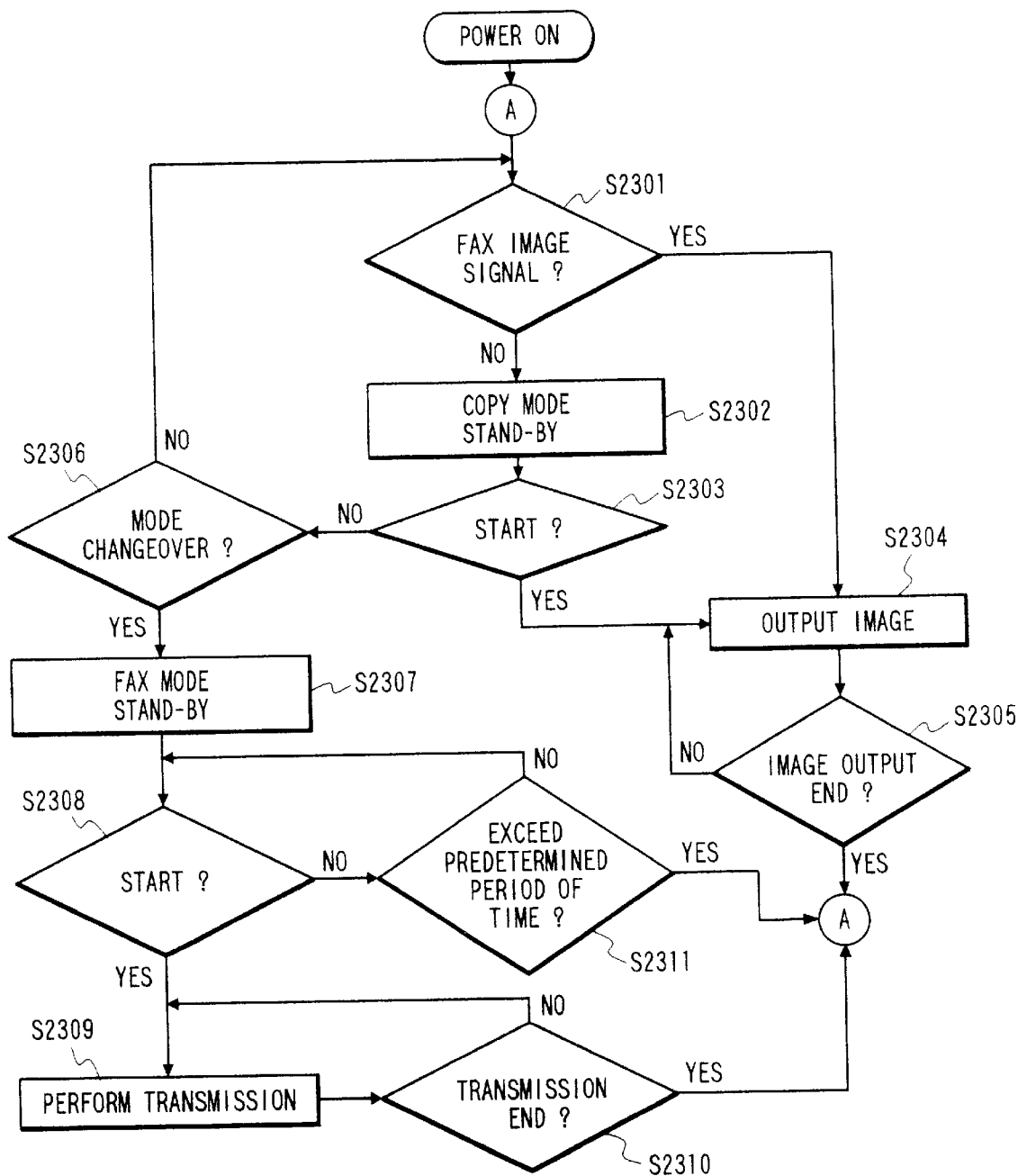
FIG. 23 is a flow chart for explaining an image output control procedure of the multi-function apparatus shown in FIG. 22.

FIG. 1 is a schematic sectional view for explaining a construction of a main portion of a multi-function apparatus according to the first embodiment. In the drawing, it should be noted that same parts as shown in FIG. 22 are added with same reference numerals.

Reference numeral 1 denotes an original pressure plate (to be referred to as pressure plate hereinafter) which rotates about a hinge 7 as a center, to press an original P8 placed on an original glass 101. Reference numeral 5 denotes a pressure plate detection member which is urged upwardly (in a direction indicated by an arrow in the drawing) by a spring 6 of which one end is fixed and thus moved upwardly and downwardly according to the rotational movement of the pressure plate 1. It should be noted that a pressure plate open/close operation detection means is composed of the pressure plate 1, the pressure plate detection member 5, the spring 6, the hinge 7, a light shield plate (photointerrupter) 10 and a photointerrupter sensor S1.

The light shield plate 10 is integrally formed with the pressure plate detection member 5 as a part thereof, and moved upwardly and downwardly in the same direction as that of the pressure plate detection member 5 in accordance with the upward/downward movements of the member 5. The light shield plate 10 passes through a portion of the sensor S1 according to the upward/downward movements of the pressure plate detection member 5, whereby the sensor S1 detects open/close states of the pressure plate 1.

That is, when the pressure plate 1 is lifted up until a predetermined angle, the light shield plate 10 of the pressure plate detection member 5 is released from a detection portion of the sensor S1, and a light-shielding state is changed to a light-incident state, whereby the sensor S1 detects that the pressure plate 1 was opened. Similarly, when the pressure plate 1 is downed from its opening state until the plate 1 directly presses the original, the light-incident state is changed to the light-shielding state, whereby the sensor S1 detects that the pressure plate 1 was downed and closed.

An original size detection means is composed of original size sensors S2 provided at several positions under the original glass 101.

The original size sensor S2 has a light emission unit and a light reception unit, and detects presence/absence of reflection of a light generated by an LED of the light emission unit so as to detect a size or presence/absence of the original. It should be noted that, under the original glass 101, the predetermined number of sensors S2 are arranged at positions capable of detecting predetermined original sizes and positions capable of detecting presence/absence of the original.

Reference symbol CONT denotes a controller unit which has a CPU, a RAM and a ROM. The controller unit CONT controls a changeover operation of each function process of the multi-function apparatus in accordance with an input signal or the like from the sensor, on the basis of control procedures shown in FIGS. 3 to 6 stored in the ROM. Reference symbol FAXCON denotes a controller unit which has a facsimile data transmission/reception process unit (not shown). The controller unit FAXCON controls via a modem (not shown), a predetermined communication medium (e.g., a public line, a facsimile communication network via a LAN, or the like) or the like such that a facsimile data process can be performed on the basis of a key instruction from a console unit 4 or reception/no reception of facsimile data. A CCD unit reads an original image focused based on an original scan by a scanner unit (not shown), and converts read analog data into a digital image signal to output it to a controller unit RCON. The controller unit RCON performs predetermined image processes (various image edit processes such as zooming, trimming, rotating and mirror processes) on the input digital image signal to generate output image data to the controller unit CONT.

Figure 2:
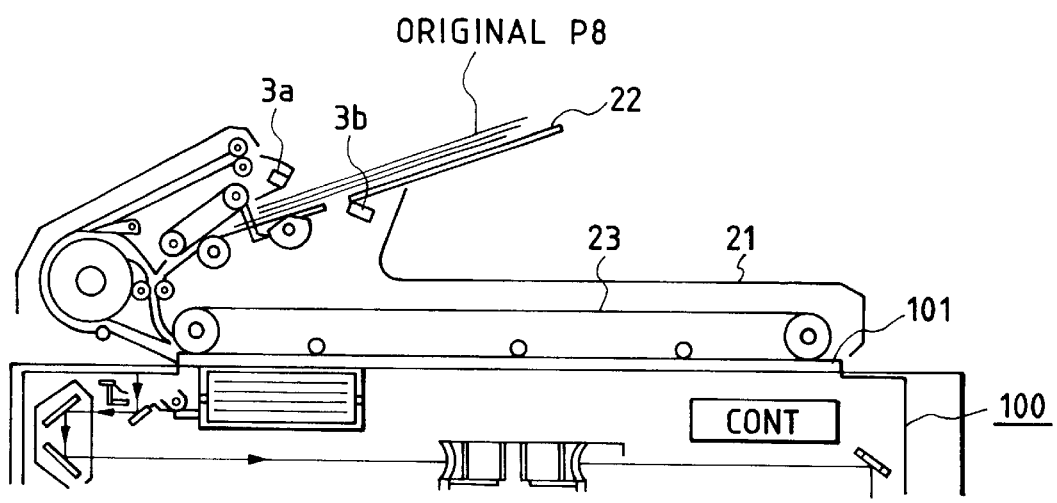
FIG. 2 is a schematic sectional view for explaining a construction of an automatic original feeder capable of being mounted on an upper portion of a main body of the multi-function apparatus shown in FIG. 1.

FIG. 2 is a perspective sectional view for explaining a construction of an automatic original feeder capable of being mounted on an upper portion of the main body of the multi-function apparatus shown in FIG. 1. In FIG. 2, it should be noted that same parts as shown in FIG. 1 are added with same reference numerals.

In the drawing, reference numeral 21 denotes an automatic original feeder which sequentially separates the original from the lower-most portion of the documents placed on an original support plate (or original tray) 22 and then feeds it into an original feeding path. Reference numeral 23 denotes an original feeding belt which feeds the original separated and fed from the plate 22 up to a predetermined position on the original glass 101. Then, after the original reading terminates, the belt 23 discharges the original on the original glass 101 to a discharge path. It should be noted that, in this case, the original is mounted on the original support plate 22 via the original feeding path in order of stacking. Further, there is provided a member for dividing the fed and discharged originals.

Reference numeral 3b denotes a light reception unit which is provided at a front surface side of the plate 22. The light reception unit 3b receives a light from a light emission unit 3a provided at an opposed position at a rear surface side of the plate 22, to detect presence/absence of the original. That is, the presence/absence of the original is detected according to whether or not the original P8 on the plate 22 shields or interrupts an optical path formed between the light emission unit 3a and the light reception unit 3b.

Hereinafter, it will be explained, with reference to a flow chart shown in FIG. 3, a first image output control operation in the multi-function apparatus according to the present invention.

Figure 3:
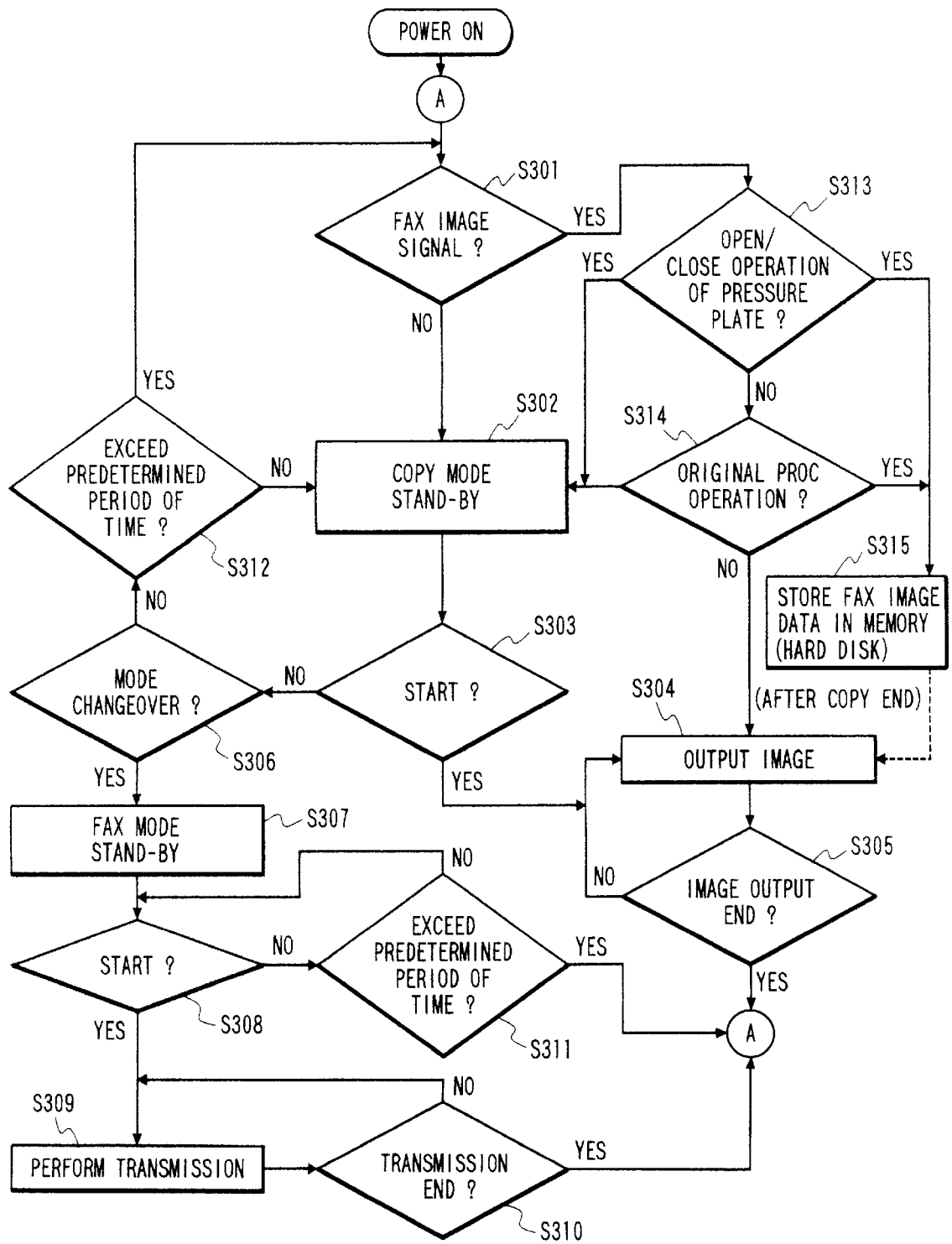
FIG. 3 is a flow chart showing an example of a first image output control procedure in the multi-function apparatus according to the present invention.

FIG. 3 is the flow chart showing an example of a first image output control procedure in the multi-function apparatus according to the present invention. In the drawing, it should be noted that reference numerals S301 to S315 denote respective steps.

When a power is turned on in the main body 100, it is judged in the step S301 whether the FAX image output signal is present or not. If it is judged that the FAX image output signal is present, then it is judged in the step S313 whether or not the open/close operation of the pressure plate 1 is detected, and further judged in the step S314 whether or not the original process operation, i.e., the original P8, is detected. In this case, if it is judged that both the open/close operation and the original P8 are not detected, the FAX image output is performed in the step S304. Then, it is judged in the step S305 whether or not the FAX image output terminates, and the flow returns to the step S301 if it is judged that the FAX image output terminates.

On the other hand, if it is judged in the step S313 or S314 that at least either the open/close operation of the pressure plate 1 or presence/absence of the original P8 is detected, the FAX image data is stored in a hard disk (not shown) or another memory means (memory card, optomagnetic disk or the like) in the step S315 (i.e., information (flag) representing storage/no storage is stored in an internal memory of the controller unit CONT). Simultaneously, the main body 100 comes to be in a stand-by state in the copy mode (COPY MODE STAND-BY).

On the other hand, if it is judged in the step S301 there is no FAX image output signal, the main body 100 comes to be in the stand-by state in the copy mode (COPY MODE STAND-BY).

Then, in the state where the main body 100 is in the stand-by state in the copy mode (COPY MODE STAND-BY), if it is judged in the step S312 there is no depression of the copy start key 2 (START) in the step S303 or no mode changeover request for requesting another function process (e.g., mode changeover instruction to a FAX mode) in the step S306 within a predetermined period of time, the flow again returns to the step S301.

On the other hand, in the state where the main body is in the stand-by state in the copy mode (COPY MODE STAND-BY) (step S302), if it is judged in the step S303 that the copy start key 2 is depressed within the predetermined period of time (START), the flow advances to the step S304.

After the copy operation terminates, if the controller unit CONT refers to the contents of the internal memory and thus judged that the flag is being set, the FAX image data stored in the hard disk in the step S315 is read out and transmitted to the main body 100. Then, after the image output operation is performed by the FAX image output unit (not-shown printer unit (laser beam printer engine)), the flow again returns to the step S301.

On the other hand, in the state where the main body 100 is in the stand-by state in the copy mode (COPY MODE STAND-BY) (step S302), if it is judged in the step S306 that the function mode was changed to the FAX mode within the predetermined period of time, the main body 100 comes to be in the stand-by state in the FAX mode (FAX MODE STAND-BY) in the step S307.

Then, in the state where the main body 100 is in the stand-by state in the FAX mode (FAX MODE STAND-BY), if it is judged in the step S308 there is no input of the FAX start key within a predetermined period of time, the flow returns to the step S301 and the main body 100 again comes to be in an initial state.

On the other hand, in the state where the main body 100 is in the stand-by state in the FAX mode (FAX MODE STAND-BY), if it is judged in the step S308 that the FAX start key (START) is depressed within the predetermined period of time, a FAX transmission is performed in the step S309. Then, it is judged in the step S310 whether or not the FAX transmission terminates. The flow again returns to the step S301, if it is judged that the FAX transmission terminates.

According to the above operation, in a case where a user prepares to set the original to be copied, even if the FAX image output signal is input, when such the setting of the original to be copied has been detected by the sensor S acting as the open/close operation detection means of the pressure plate 1 or the sensor S2 acting as the original detection means, and the light emission and reception units 3a and 3b, the image output responsive to the FAX image output signal can be inhibited.

The FAX image data is once stored in the not-shown hard disk included in the main body 100 (or another memory means). Then, after the copy operation terminates, the flag representing such the storage or no storage is referred. In this case, if the flag has been set, the FAX image data is transmitted from the hard disk to the image output unit of the main body 100 to be printed out.

Although the multi-functions apparatus main body 100 keeps the stand-by state in the copy mode, if there is no copy start signal from the console unit 4 or another operation instruction signal (e.g., function mode changeover signal) after elapsing the predetermined period of time (concretely, a predetermined period of time after the preparation of copy original setting is detected by the sensor S2, the light emission unit 3a and the light reception unit 3b), it is controlled that the main body automatically returns to the initial state. Therefore, in the case where the copy function process is being performed, such the process can be maintained with certainly limiting the interruption request for another function process. In addition, the reception information based on the FAX function can automatically be spooled, so that the printing by the print function process can be performed at an appropriate timing, i.e., after the copy function process terminates.

Second Embodiment

It was explained in the above first embodiment that the image output is controlled by providing the pressure plate open/close detection means and the original detection means. However, the image output may be controlled by providing a key operation detection means instead of the pressure plate open/close detection means and the original detection means.

The key operation detection means is a not-shown detection means which detects whether or not all of operation keys except for a function mode changeover switch and a one-touch dial key 8 on a console unit 4 are depressed (i.e., the detection means for detecting whether or not a signal from an input port for notifying the key inputs of the console unit 4 to a controlled unit CONT is present).

Hereinafter, it will be explained, with reference to a flow chart shown in FIG. 4, a second image output control operation in a multi-function apparatus according to the present invention.

Figure 4:
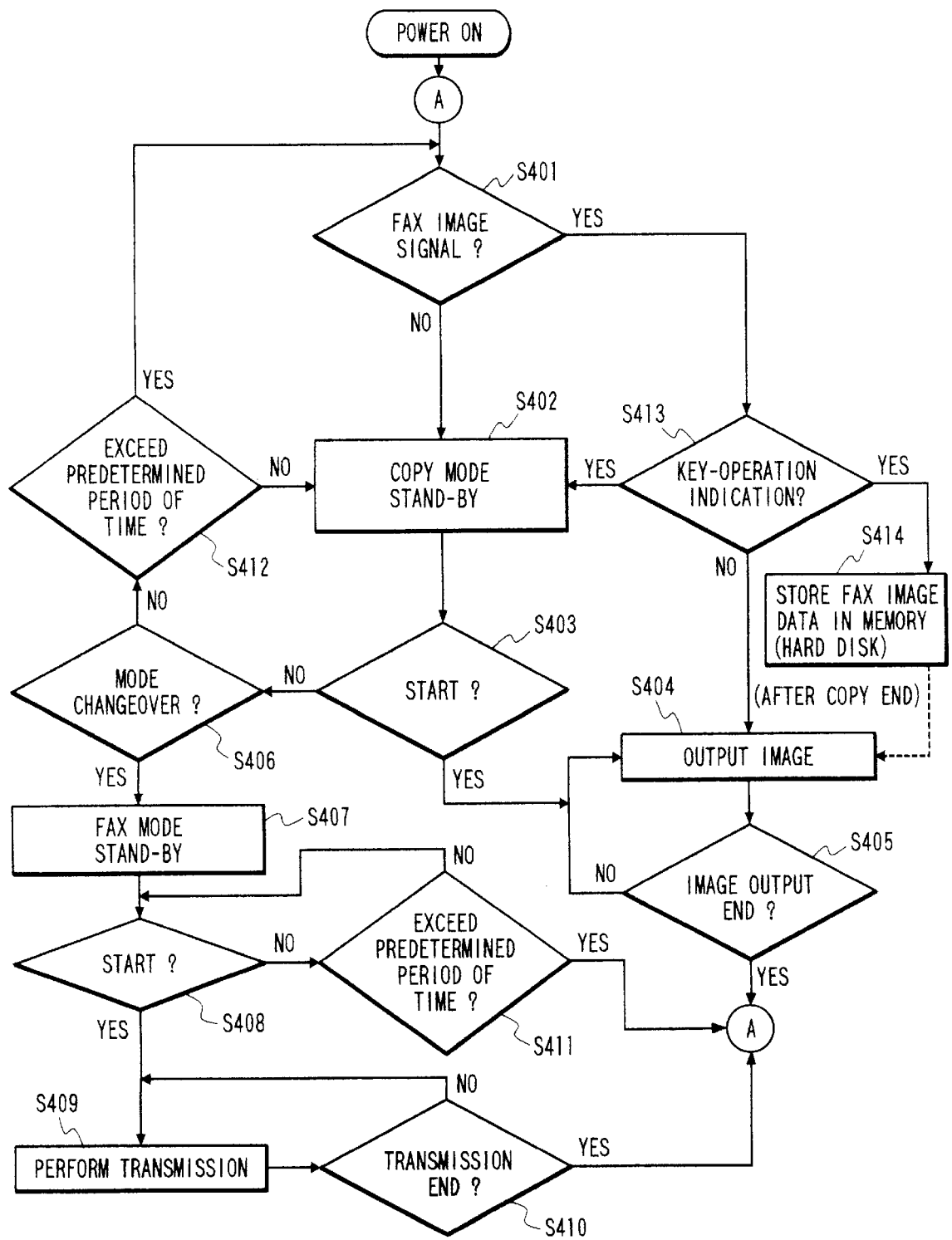
FIG. 4 is a flow chart showing an example of a second image output control procedure in the multi-function apparatus according to the present invention.

FIG. 4 is the flow chart showing an example of a second image output control procedure in the multi-function apparatus according to the present invention. In the drawing, it should be noted that reference numerals S401 to S414 denote respective steps.

When, a power is turned on in a main body 100, it is judged in the step S401 whether or not a FAX image output signal is present. If it is judged that the FAX image output signal is present, the controller unit CONT judges in the step S413 whether or not all of the operation keys are depressed except for the function mode changeover switch and the one-touch dial key 8 on the console unit 4. If it is judged that the depression of these keys is not detected, a FAX image output is performed in the step S404. Then, if it is judged in the step S405 whether or not the FAX image output terminates. After it was judged that the FAX image output terminates, the flow again returns to the step S401.

On the other hand, if it is judged in the step S413 that any one of these keys is depressed, FAX image data is stored in a hard disk (not shown) or another memory means (memory card, optomagnetic disk or the like) in the step S414 (i.e., information (flag) representing storage/no storage is stored in an internal memory of the controller unit CONT). Simultaneously, the main body 100 comes to be in a stand-by state in the copy mode (COPY MODE STAND-BY) in the step S402.

On the other hand, if it is judged in the step S401 there is no FAX image output signal, the main body 100 comes to be in the stand-by state in the copy mode (COPY MODE STAND-BY) (step S402).

Then, in the state where the main body 100 is in the stand-by state in the copy mode (COPY MODE STAND-BY), if it is judged in the step S412 there is no depression of the copy start key 2 (START) in the step S403 or no mode changeover request for requesting another function process (e.g., mode changeover instruction to a FAX mode) in the step S406 within a predetermined period of time (concretely, a predetermined period of time after detecting the open/close of the pressure plate 1 or detecting the original P8), the flow again returns to the step S401.

On the other hand, in the state where the main body is in the stand-by state in the copy mode (COPY MODE STAND-BY) (step S402), if it is judged in the step S403 that the copy start key 2 is depressed within the predetermined period of time (START), the flow advances to the step S404.

After the copy operation terminates, if the controller unit CONT refers to the contents of the internal memory and thus judged that the flag is being set, the FAX image data stored in the hard disk in the step S414 is read out and transmitted to the main body 100. Then, after the image output operation is performed by the FAX image output unit (not-shown printer unit (laser beam printer engine)), the flow again returns to the step S401.

On the other hand, in the state where the main body 100 is in the stand-by state in the copy mode (COPY MODE STAND-BY) (step S402), if it is judged in the step S406 that the function mode is changed to the FAX mode within the predetermined period of time, the main body 100 comes to be in the stand-by state in the FAX mode (FAX MODE STAND-BY) in the step S407.

Then, in the state where the main body 100 is in the stand-by state in the FAX mode (FAX MODE STAND-BY), if it is judged in the step S408 there is no input of the FAX start key within a predetermined period of time, the flow returns to the step S401 and the main body 100 again comes to be in an initial state.

On the other hand, in the state where the main body 100 is in the stand-by state in the FAX mode (FAX MODE STAND-BY), if it is judged in the step S408 that the FAX start key (START) is depressed within the predetermined period of time, a FAX transmission is performed in the step S409. Then, it is judged in the step S410 whether or not the FAX transmission terminates. The flow again returns to the step S401, if it is judged that the FAX transmission terminated.

According to the above operation, in a case where a user prepares to set the original to be copied (e.g., in case of zoom input, copy number input or the like), by the key operation detection means (controlled by the controller unit CONT), instructions of all of the operation keys except for the function mode changeover switch and the one-touch dial key 8 on the console unit 4 are judged as that a copy function process request is being instructed. Therefore, same as in the first embodiment, the image information based on the FAX reception is spooled in the hard disk or the like during the either one of key instructions is being performed, so that the copy function process can be made preferential.

Third Embodiment

It was explained in the above first and second embodiments the case where another interruption request is limited during the copy function process is being executed. However, in the present embodiment, a function mode is automatically changed from a copy stand-by mode to a facsimile (FAX) mode by detecting depression states of numeral keys or one-touch dial keys provided on a console unit 4, and then a FAX function process can be performed immediately by depressing a copy start key after FAX transmission preparation operation at the console unit 4 terminates. This third embodiment for realizing such an operation will be explained hereinafter.

In the present embodiment, in a multi-function apparatus main body 100 having such a construction as shown in FIG. 1, after a power is turned on, a numeral key count means checks whether or not a FAX image output signal is present in a manner described later. At that time, if there is no FAX image output, the main body 100 automatically comes to be in a stand-by state in a copy mode.

In this case, even if a user sets a FAX transmission original in the copy mode, when he inputs a telephone number of a destination of FAX transmission by using a numeral key 9, the copy mode is automatically changed to a FAX mode by the later-described numeral key count means (controlled by a count function process of a controller unit CONT). Therefore, when the user depresses a copy start key 2, he can perform a FAX transmission.

In the present embodiment, the numeral key count means is operated by the count function of the controller unit CONT in the main body 100. That is, a numeral has previously been set. For example, a numeral "6" has been set, because generally there should be no copy number setting exceeding six figures except for a setting of a telephone number. Then, when a numeral exceeding six figures is input, the numeral key count means judges that the input numeral is a telephone number.

Concretely, when the controller unit CONT detects that the numeral key 9 on the console unit 4 is depressed, the total number of continuous depression of the numeral key 9 is compared with the numeral previously set in a RAM of the controller unit CONT. Then, if the total number of continuous depression is larger than the set numeral, the main body 100 automatically changes a copy mode state to a FAX mode state. On the other hand, if the total number is less than the set numeral, the main body 100 controls such the copy mode state to be continued. It should be noted that a detailed control procedure is according to a flow chart shown in FIG. 5.

Hereinafter, it will be explained, with reference to the flow chart shown in FIG. 5, a function mode changeover control operation of the multi-function apparatus according to the present invention.

Figure 5:
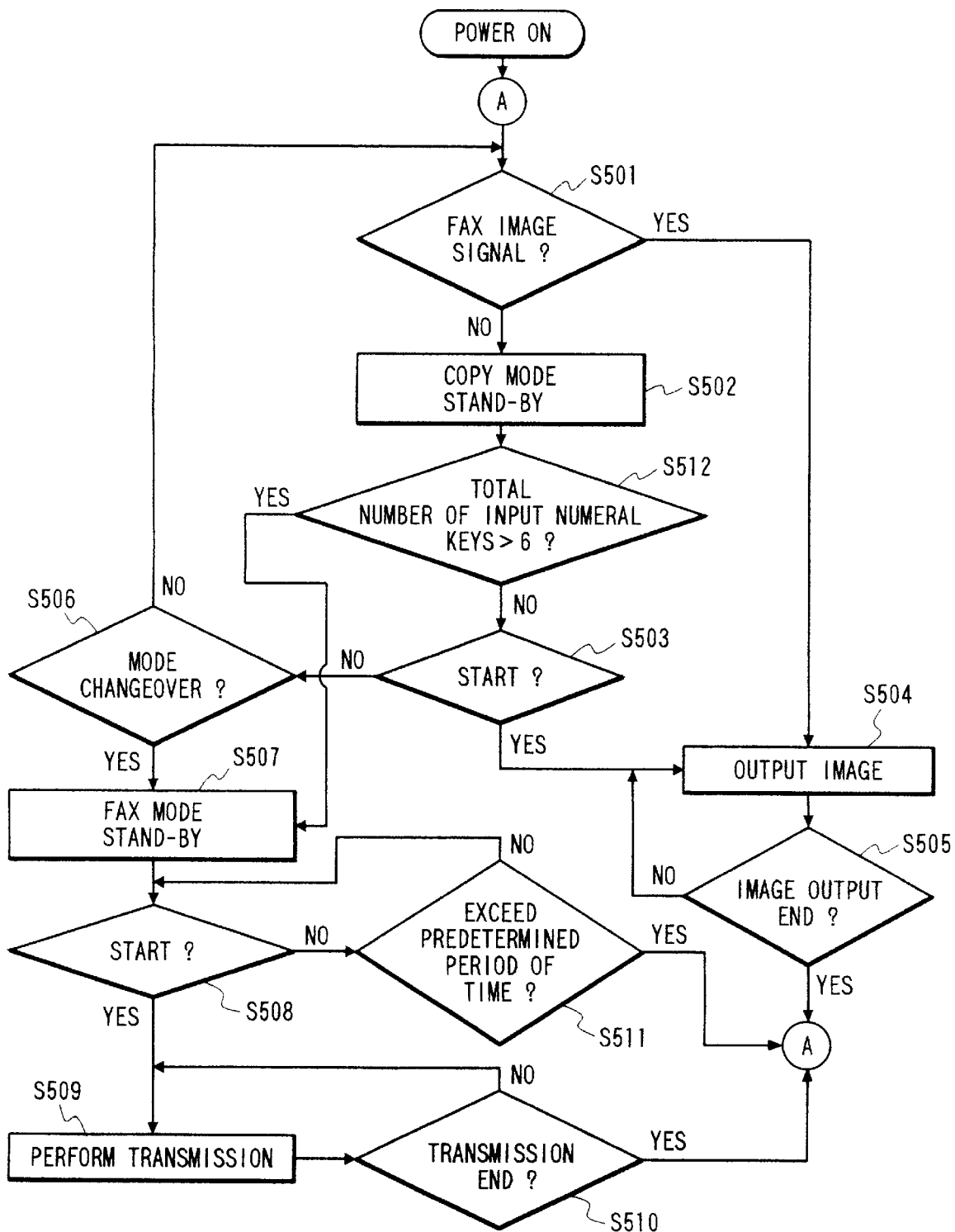
FIG. 5 is a flow chart showing an example of a first function mode changeover control procedure in the multi-function apparatus according to the present invention.

FIG. 5 is the flow chart showing an example of a first function mode changeover control procedure in the multi-function apparatus according to the present invention. In the drawing, reference numerals S501 to S512 denote respective steps.

When a power is turned on in the main body 100, it is judged in the step S501 whether or not a facsimile (FAX) image output signal is present. If it is judged that the FAX image output signal is present, the flow advances to the step S504 to perform a FAX image output. Then, it is judged in the step S505 whether or not the FAX image output terminates. If it is judged that the FAX image output terminates, the flow again returns to the step S501.

On the other hand, if it is judged in the step S501 that the FAX image output signal is not present, the main body 100 comes to be in a stand-by state in a copy mode (COPY MODE STAND-BY) in the step S502. Then, it is judged in the step S512 whether or not a total number of numerals exceeds "6". In this case, the numerals are input for a FAX transmission preparation by the user through a ten key (numeral key) on the console unit 4. If NO in the step S512, such an input is considered as a key operation irrelative to a key operation for the FAX transmission preparation, so that the flow advances to the step S503.

On the other hand, if it is judged in the step S512 that the total number of the input numerals is equal to or larger than "6", such the input is considered as the key operation for the FAX transmission preparation (i.e., telephone number input operation), so that the flow advances to the step S507 and the following steps such that the stand-by state in the copy mode (COPY MODE STAND-BY) (step S502) set in the step S502 is changed to a stand-by state in a FAX mode (FAX MODE STAND-BY).

Then, in the state where the main body 100 is in the stand-by state in the copy mode (COPY MODE STAND-BY), it is judged in the step S503 whether or not the copy start key 2 is depressed (START). If it is judged that the copy start key 2 is depressed, the same image output as above is performed in the step S504.

On the other hand, if it is judged in the step S503 that the copy start key 2 is not depressed, the main body 100 in the stand-by state in the copy mode (COPY MODE STAND-BY) comes to be in a mode changeover instruction stand-by state. Then, it is judged in the step S506 whether or not a function mode was changed to the FAX mode. If it is judged that the mode change was performed, the main body 100 comes to be in the stand-by state in the FAX mode (FAX MODE STAND-BY) in the step S507.

Then, in the state where the main body 100 is in the stand-by state in the FAX mode (FAX MODE STAND-BY), it is judged in the step S508 whether or not an input by a FAX start key is performed within a predetermined period of time. If it is judged there is no input, the flow returns to the step S501 such that the main body 100 again comes to be in an initial state.

On the other hand, if it is judged in the step S511 that the FAX start key is depressed within the predetermined period of time (START), a FAX transmission is performed in the step S509. Then, if it is judged in the step S510 that the FAX transmission terminates, the flow again returns to the initial-state step S501.

According to such an operation, in the case where the main body 100 is in the stand-by state in the copy mode (COPY MODE STAND-BY), the telephone number input operation by the numeral key on the console unit 4, i.e., the FAX transmission preparation operation, is managed as effective information. Then, after such an input process terminates, when the copy start key is depressed, an automatic dial process can start for a destination of which telephone number was input. Therefore, it can be eliminated a conventional problem that the FAX transmission preparation operation wastes.

Fourth Embodiment

It was explained in the above third embodiment that the total number of inputting of the numeral key 9 is counted, and the function mode is changed by comparing such the total number with the stored numeral. However, a depression state of a one-touch dial key 8 on a console unit 4 may be detected to control a function mode changeover operation. The fourth embodiment for realizing such the operation will be explained hereinafter.

In the present embodiment, there is provided structure in which a controller unit CONT detects whether or not the one-touch dial key 8 on the console unit 4 is depressed.

Hereinafter, it will be explained, with reference to a flow chart shown in FIG. 6, a second function mode changeover control operation in a multi-function apparatus according to the present invention.

Figure 6:
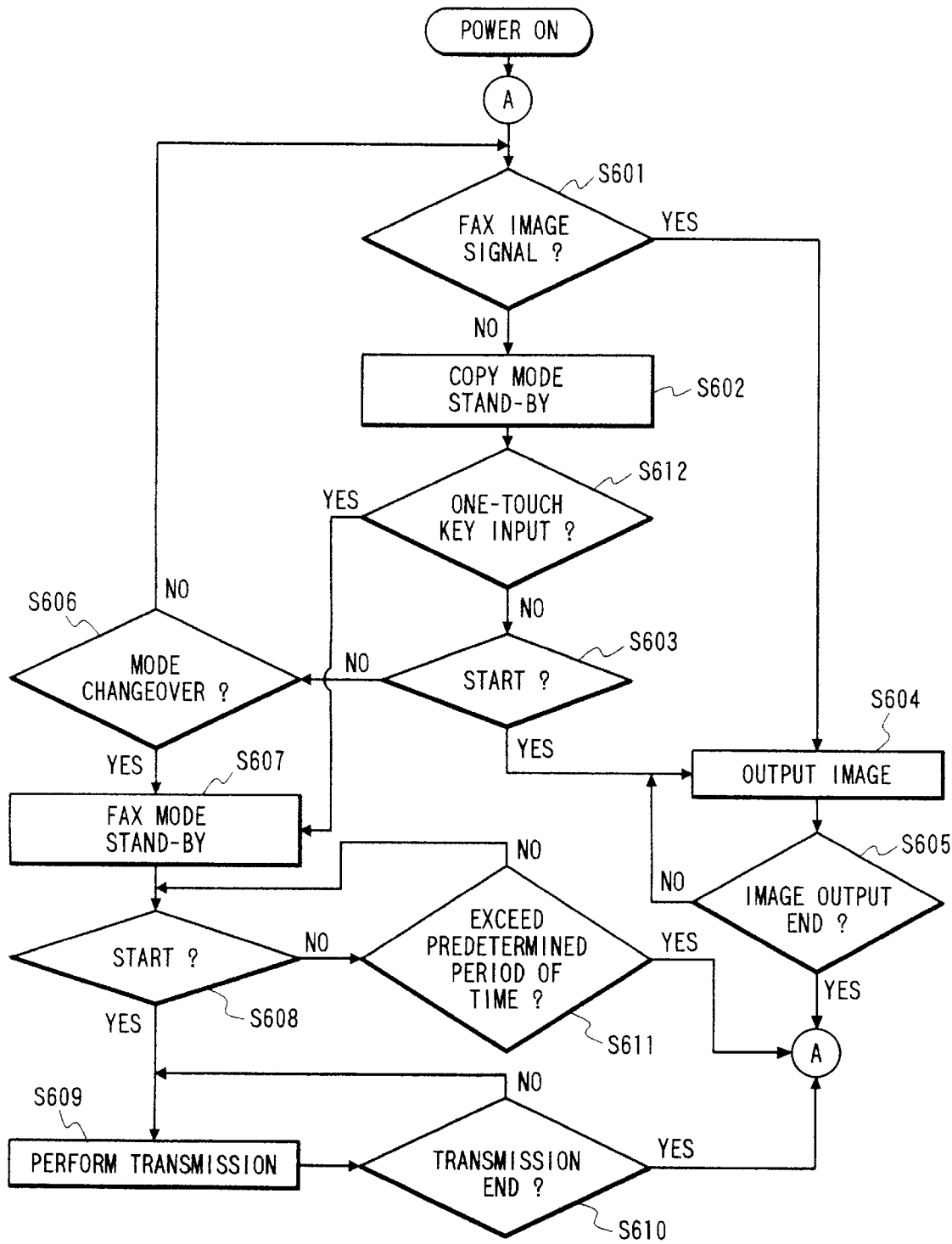
FIG. 6 is a flow chart showing an example of a second function mode changeover control procedure in the multi-function apparatus according to the present invention.

FIG. 6 is the flow chart showing an example of a second function mode changeover control procedure in the multi-function apparatus according to the present invention. In the drawing, reference numerals S601 to S612 denote respective steps.

When a power is turned on in a main body 100, it is judged in the step S601 whether or not a facsimile (FAX) image output signal is present. If it is judged that the FAX image output signal is present, the flow advances to the step S604 to perform a FAX image output. Then, it is judged in the step S605 whether or not the FAX image output terminates, and the flow again returns to the step S601 if it is judged that the output terminates.

On the other hand, if it is judged in the step S601 there is no FAX image output signal, the main body 100 comes to be in a stand-by state in a copy mode (COPY MODE STAND-BY) in the step S602. Then, it is judged in the step S612 whether or not a user instructs a partner or destination for a FAX transmission preparation by depressing the one-touch dial key 8 on the console unit 4. If NO in the step S612, such an input is considered as a key operation irrelative to a key operation for the FAX transmission preparation, and the flow advances to the step S603.

On the other hand, if it is judged in the step S612 that the one-touch dial key 8 was depressed, such the input is considered as a key operation for the FAX transmission preparation (i.e., telephone number input operation). Then, the flow advances to the step S607 and the following steps such that the stand-by state in the copy mode (COPY MODE STAND-BY) set in the step S602 is changed to a stand-by state in a FAX mode (FAX MODE STAND-BY).

Then, in the state where the main body 100 is in the stand-by state in the copy mode (COPY MODE STAND-BY), it is judged in the step S603 whether a copy start key 2 is depressed (START). If it is judged that the copy start key 2 is depressed, the same image output as above is performed in the step S604.

On the other hand, if it is judged in the step S603 that the copy start key 2 is not depressed, the main body 100 in the stand-by state in the copy mode (COPY MODE STAND-BY) comes to be in a mode changeover instruction stand-by state. Then, it is judged in the step S606 whether or not a function mode is changed to the FAX mode. If it is judged that a mode changeover was performed, the main body 100 comes to be in the stand-by state in the FAX mode (FAX MODE STAND-BY) in the step S607.

Then, in the state where the main body 100 is in the stand-by state in the FAX mode (FAX MODE STAND-BY), it is judged in the step S608 whether or not inputting of a FAX start key is performed within a predetermined period of time. If it is judged there is no input, the flow returns to the step S601 such that the main body 100 again comes to be in an initial state.

On the other hand, if it is judged in the step S611 that the FAX start key was depressed within the predetermined period of time (START), a FAX transmission is performed in the step S609. Then, after it was judged in the step S610 that the FAX transmission terminates, the flow again returns to the step S601.

According to such an operation, when the controller unit CONT detects that the one-touch dial key 8 was depressed, the controller unit CONT of the multi-function apparatus main body 100 automatically judges that a user's FAX transmission preparation operation is performed and thus automatically changes a function mode setting state of the main body 100 to the FAX mode. Then, after the user's FAX transmission preparation operation terminates (in this case a FAX transmission destination is input by the one-touch dial key 8), if the copy start key 2 is depressed, a FAX transmission preparation process which was previously set before such a depression is managed as effective information, whereby the FAX transmission can immediately be performed.

Further, the process in the present embodiment may be applied to a system consisting of a plurality of devices or to an apparatus consisting of a single device. Of course, the process in the present invention can be applied to an operation which is achieved by supplying a program to the system or apparatus. In this case, if a storage medium which stored the program represented by a software for achieving the process in the present embodiment is read by the system or apparatus, such the system or apparatus can be given the effect derived from the process in the present embodiment.

Furthermore, if the program represented by the software for achieving the effect of the process in the present embodiment is downloaded to be read from a data base on a network by using a communication program, the system or apparatus can be given the effect derived from the process in the present embodiment.

It should be noted that the present invention is not limited to each of the above embodiments, but can be applied to an image processing apparatus including multi-function processes. In the above embodiments, it was explained that, in the case where the FAX mode and the copy mode are concurred, the process in the copy mode is preferentially performed. However, in the multi-function apparatus, the present invention can effectively be applied to concurrence between the copy mode and other image process mode, e.g., a print mode (to process print data from a host computer via not-shown interface).

Hereinafter, further embodiments of the present invention will be explained.

Fifth Embodiment

Figure 7:
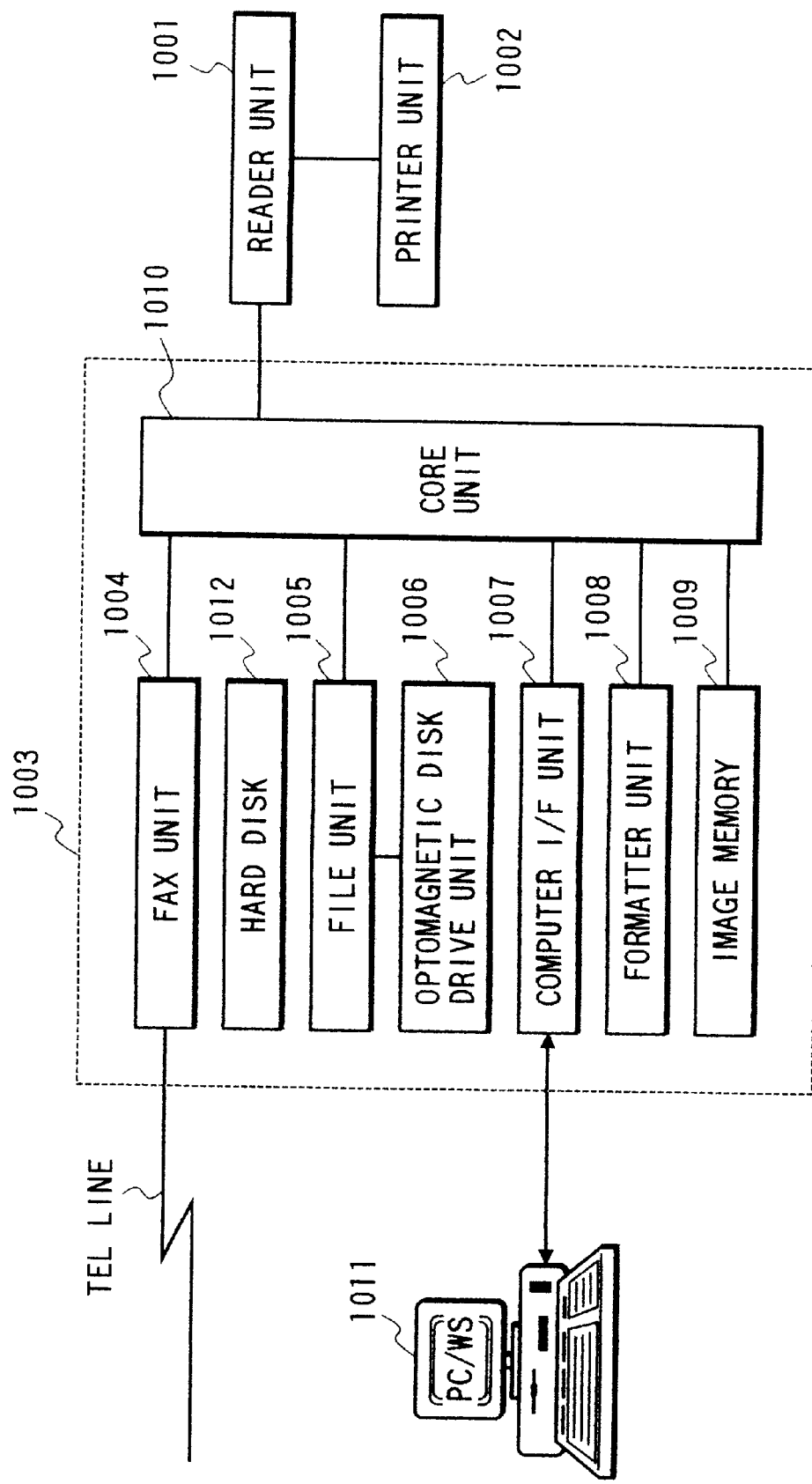
FIG. 7 is a block diagram showing a schematic construction of a multi-function apparatus according to fifth and sixth embodiments of the present invention.

FIG. 7 is a block diagram showing structure of a multi-function apparatus according to the fifth embodiment of the present invention.

A reader unit 1001 reads an image on an original, and outputs image data according to the original image to a printer unit 1002 and an image input/output control unit 1003.

The printer unit 1002 records an image according to the image data from the reader unit 1001 and the image input/output control unit 1003, on a recording paper.

The image input/output control unit 1003 is connected to the reader unit 1001 and composed of a facsimile unit 1004, a file unit 1005, a computer interface unit 1007, a formatter unit 1008, an image memory unit 1009, a core unit 1010 and the like.

The facsimile unit 1004 expands compression image data received via a telephone line and then transfers the expanded image data to the core unit 1010. Further, the facsimile unit 1004 compresses the image data transferred from the core unit 1010 and then transmits obtained compression image data via the telephone line. A hard disk 1012 is connected to the facsimile unit 1004, whereby the received compression image data can be temporarily stored.

An optomagnetic disk drive unit 1006 is connected to the file unit 1005. The file unit 1005 compresses the image data transferred from the core unit 1010 and then stores the obtained compression image data together with a keyword used for searching it in an optomagnetic disk which is set in the optomagnetic disk drive unit 1006. Further, the file unit 1005 searches the compression image data stored in the optomagnetic disk on the basis of the keyword transferred via the core unit 1010, reads and expands the searched compression image data, and then transfers the expanded image data to the core unit 1010.

The computer interface unit 1007 is an interface between a personal computer or work station (PC/WS) 1011 and the core unit 1010.

The formatter unit 1008 develops code data representing an image transferred from the PC/WS 1011 into the image data recordable by the printer unit 1002.

The image memory unit 1009 temporarily stores the data transferred via the core unit 1010.

The core unit 1010 (later explained in detail) controls data flows among the reader unit 1001, the facsimile unit 1004, the file unit 1005, the computer interface unit 1007, the formatter unit 1008 and the image memory unit 1009.

Figure 8:
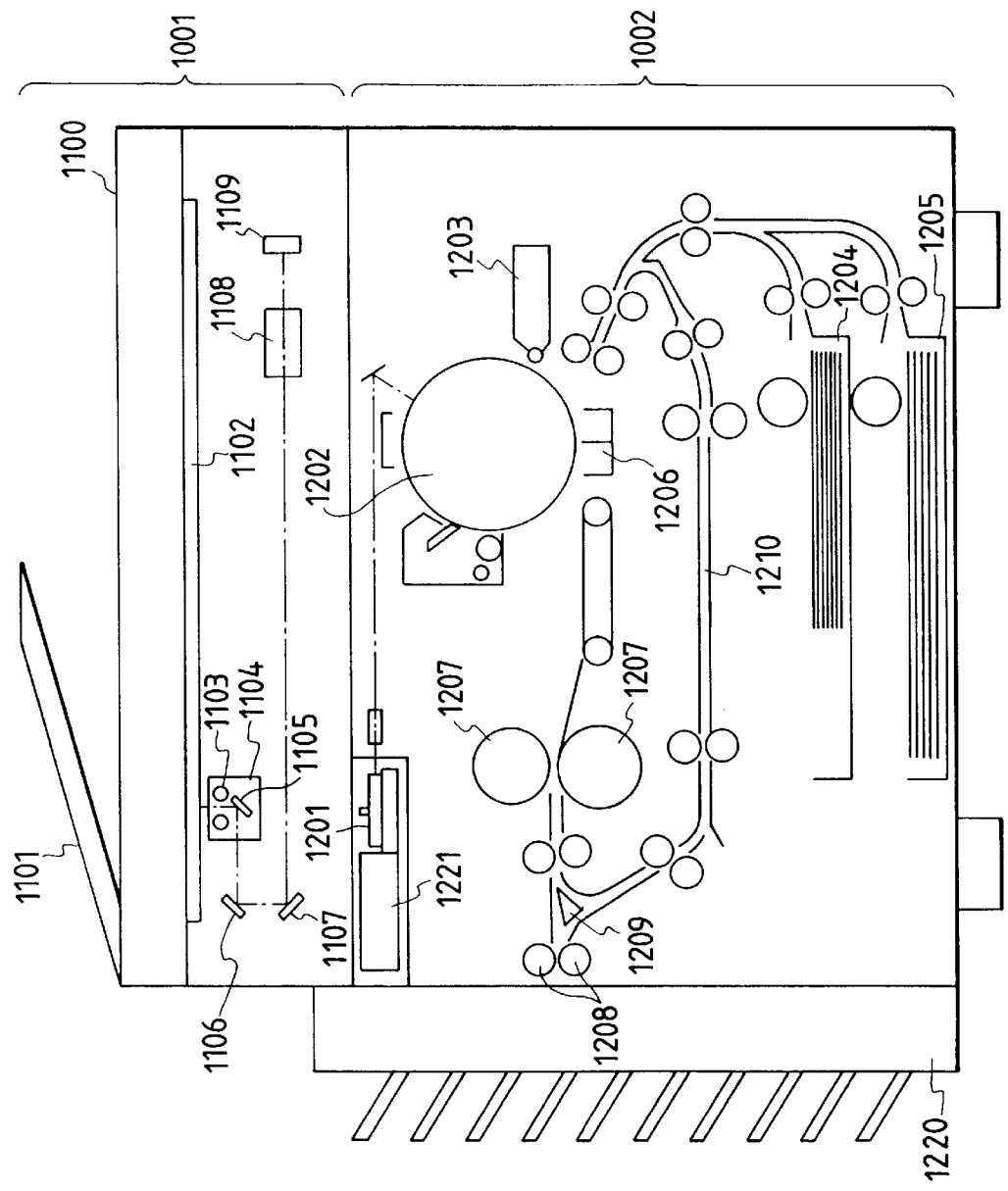
FIG. 8 is a sectional view showing a reader unit 1001 and a printer unit 1002.

FIG. 8 is a sectional view showing the reader unit 1001 and the printer unit 1002.

An original feeder 1101 of the reader unit 1001 is integrally formed with a pressure plate 1100 which presses the original placed on an original support plate. Initially, the pressure plate 1100 and the original feeder 1101 (hereinafter only the pressure plate 1100 is referred with respect to open/close operation) is closed, and the original is placed on the original feeder 1101. Then, when reading is instructed, the original is sequentially fed page by page from its final page to a predetermined reading position on a platen glass 1102, and thereafter the original on the platen glass 1102 is discharged (i.e., cycled to an initial position) after the reading of the original image terminates. When the original image reading is instructed, a lamp 1103 is turned on, and a scanner unit 1104 starts to move so as to scan the original on the platen glass 1102 with exposing it. At that time, a reflection light from the original is introduced into a CCD image sensor (to be referred to as CCD hereinafter) 1109 by using mirrors 1105, 1106 and 1107 and a lens 1108, so that the original image scanned in such a manner is read by the CCD 1109. Image data output from the CCD 1109 is subjected to a predetermined process and then transferred to the printer unit 1102 and the core unit 1010 of the image input/output control unit 1003.

A laser driver 1221 of the printer unit 1002 drives a laser beam generation unit 1201 to cause the unit 1201 to generate a laser beam according to the image data output from the reader unit 1001. The laser beam is irradiated onto a photosensitive drum 1202 so that a latent image according to the laser beam is formed on the photosensitive drum 1202. A developer is added to a latent-image portion on the drum 1202 by a development unit 1203. Then, a recording paper is fed from either one of cassettes 1204 and 1205 to a transfer unit 1206 at a timing in synchronism with irradiation start of the laser beam, so that the developer added on the photosensitive drum 1202 is transferred to the recording paper. The recording paper on which the developer is added is then fed to a fixing unit 1207 so that the developer is fixed onto the recording paper by means of heat and pressure in the fixing unit 1207. The recording paper passed through the fixing unit 1207 is discharged by a discharge roller 1208, and a sorter 1220 sorts out the discharged recording papers by holding them into respective bins. If no sorting mode is set, the sorter 1220 holds the recording papers in an uppermost bin. Further, if a two-surface recording mode is set, after feeding the recording paper to the discharge roller 1208, a rotational direction of the roller 1208 is reversed so as to introduce the recording paper into a re-feeding path by using a flapper 1209. Furthermore, if a multi-recording mode is set, the recording paper is introduced into the re-feeding path by using the flapper 1209 so as not to feed the paper to the discharge roller 1208. The recording paper introduced into the re-feeding path is then fed to the transfer unit 1206 at the timing described above.

Figure 9:
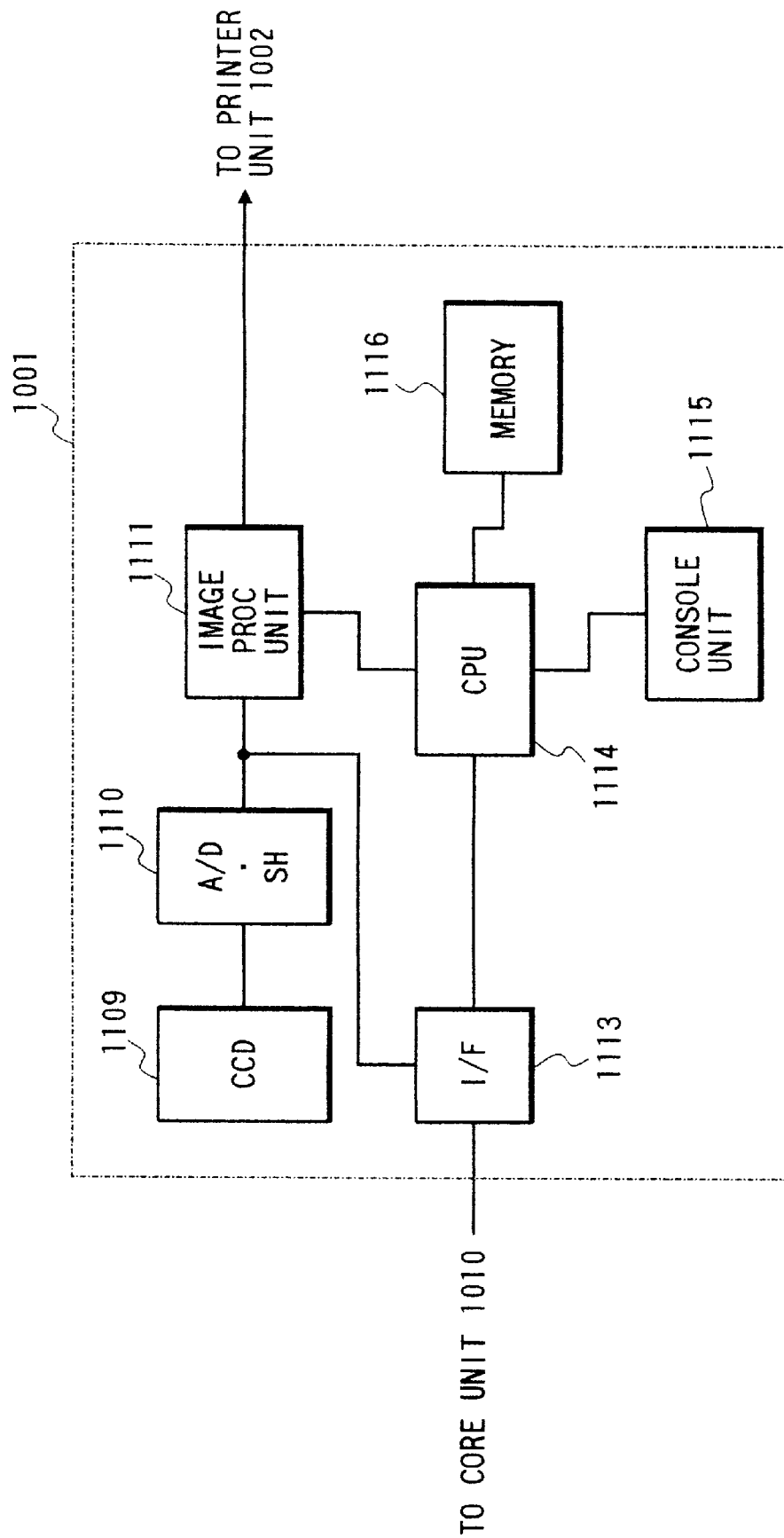
FIG. 9 is a block diagram showing a construction of the reader unit 1001.

FIG. 9 is a block diagram showing the reader unit 1001.

The image data output from the CCD 1109 is subjected to an analog-to-digital conversion and a shading correction by an A/D and SH unit 1110. Then, the image data processed in the A/D and SH unit 1110 is transferred to the printer unit 1002 via an image process unit 1111, and a simultaneously transferred to the core unit 1010 in the image input/output control unit 1003 via an interface 1113.

A CPU 1114 controls the image process unit 1111 and the interface 1113 in accordance with setting contents set by a console unit 1115. For example, if it is set by the console unit 1115 that a copy operation is performed after a trimming process, the CPU 1114 controls causes the image process unit 1111 to perform the trimming process and then transfer the processed data to the printer unit 1002. On the other hand, if a facsimile transmission process is set by the console unit 1115, the CPU 1114 causes the interface 1113 to transfer the image data and a control command according to the setting mode, to the core unit 1010. Control programs of the CPU 1114 for performing such operations have been stored in a memory 1116, so that the CPU 1114 performs the controlling with referring to the memory 1116. Also, the memory 1116 is used as a working area of the CPU 1114.

Further, the CPU 1114 detects whether the pressure plate 1100 is opened or closed, whether or not the original is placed on the original feeder 1101, whether or not the already-read original remains on the platen glass 1102, the states of the reader unit 1001 and the printer unit 1002 (based on the open/close of the pressure plate after the reading instruction), the state of the console unit 1115, or the like. Moreover, the CPU 1114 performs various time counting or the like.

Figure 10:
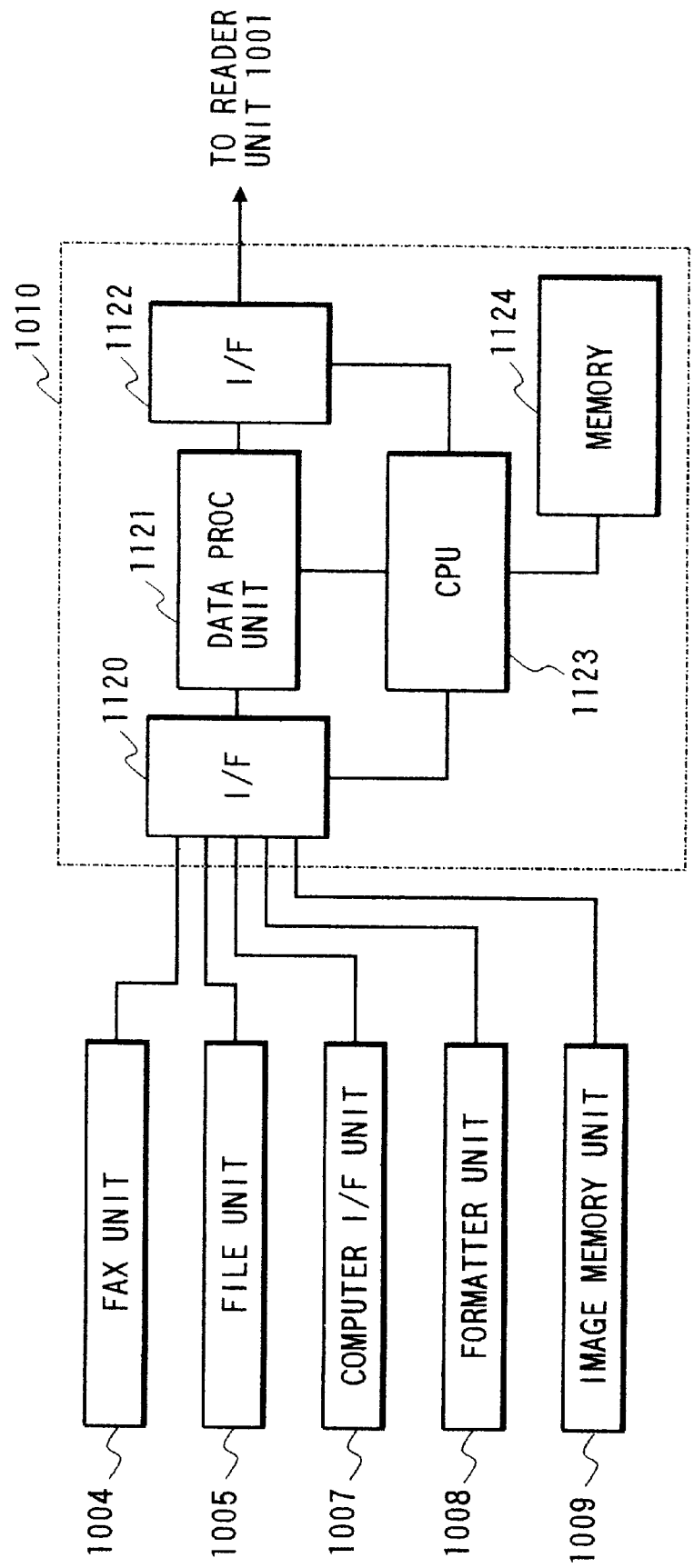
FIG. 10 is a block diagram showing a construction of a core unit 1010.

FIG. 10 is a block diagram showing the core unit 1010.

The image data from the reader unit 1001 is transferred to a data process unit 1121 and the control command from the reader unit 1001 is transferred to a CPU 1123.

The data process unit 1121 performs image processes such as a image rotation process, a zooming process and the like. The image data transferred from the reader unit 1001 to the data process unit 1121 is further transferred to the facsimile unit 1004, the file unit 1005 and the computer interface unit 1007 via an interface 1120 in accordance with the control command transferred from the reader unit 1001.

The code data representing the image which was input via the computer interface 1007 is transferred to the data process unit 1121, and then transferred to the formatter unit 1008 to be developed into the image data. The obtained image data is transferred to the data process unit 1121 and then transferred to the facsimile unit 1004 or the printer unit 1002.

The image data from the facsimile unit 1004 is transferred to the data process unit 1121 and then transferred to the printer unit 1002, the file unit 1005 or the computer interface unit 1007.

Further, the image data from the file unit 1005 is transferred to the data process unit 1121 and then transferred to the printer unit 1002, the facsimile unit 1004 or the computer interface unit 1007.

The CPU 1123 performs such the controlling as above in accordance with control programs stored in a memory 1124 and the control command transferred from the reader unit 1001. Also, the memory 1124 is used as a working area of the CPU 1123.

As described above, by using the core unit 1010 as a central unit, it can be performed the process in which various functions such as original image read, image print, image transmission and reception, image storage, data input/output to/from the computer and the like are mixed.

Further, the CPU 1114 and the CPU 1123 communicate with each other to exchange necessary information.

Figure 11:
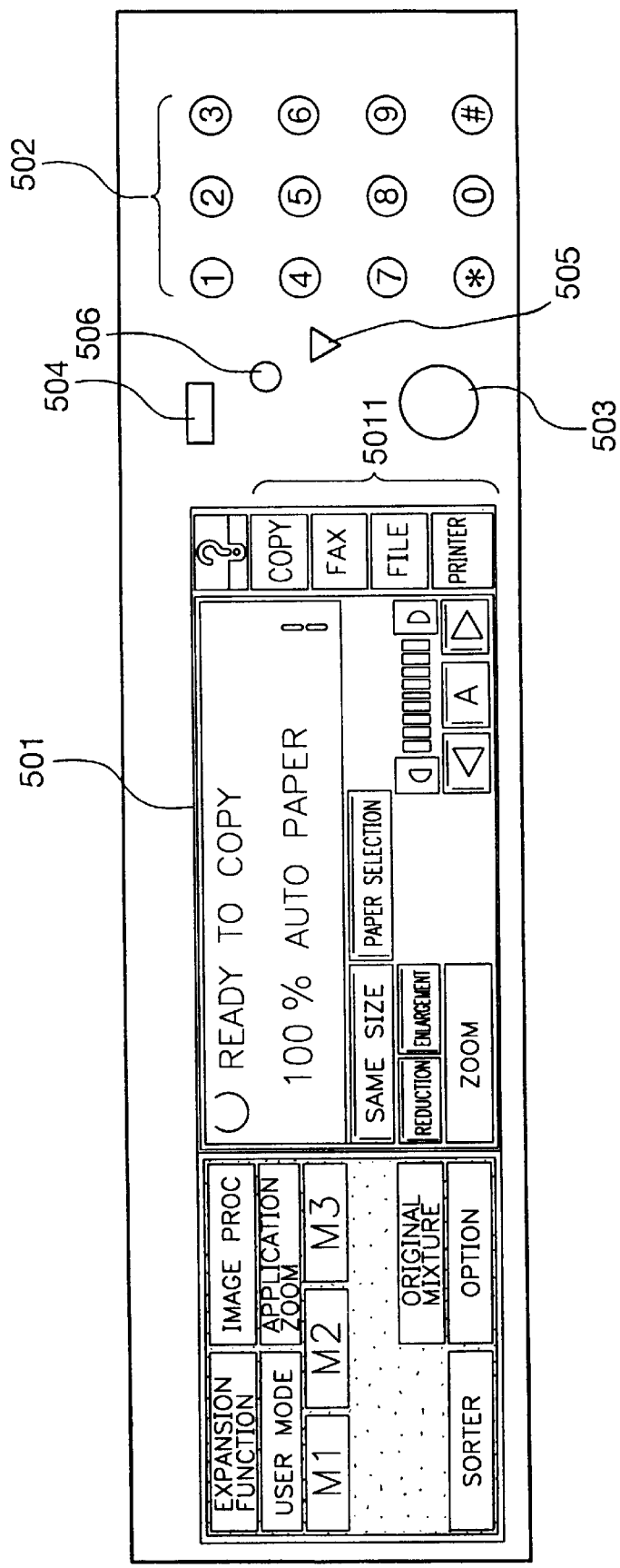
FIG. 11 is a view showing contents of a console unit 1115.

FIG. 11 is a schematic view showing a configuration of the console unit 115.

Reference numeral 501 denotes a touch panel portion which displays operation states of the apparatus and various messages. When a desired point on the touch panel portion 501 is touched, corresponding information is transferred to the CPU 1114 to be able to perform the various processes. Reference numeral 5011 denotes changeover keys for performing mode changes (i.e., copy mode, facsimile mode, file mode and printer mode are arranged sequentially from the top). The process according to the mode selected by the changeover keys 5011 can be performed. However, when a facsimile reception is performed, the selected mode is automatically changed to the facsimile mode if the printing is capable by the printer unit 1002, so that the printer unit 1002 starts to print out reception data. Further, one of these four modes can be set as an initial mode, and the mode which is set as the initial mode is automatically selected when a power is turned on or while the apparatus does not operate for a predetermined period of time.

Reference numeral 502 denotes a ten key which inputs numerals for destination inputting, copy number setting or the like.

Reference numeral 503 denotes a start key which is used for instructing to start each operation, e.g., to start original image reading.

Reference numeral 504 denotes a reset key. By depressing the reset key 504, the various setting are cleared so that the apparatus comes to be in a default state.

Reference numeral 505 denotes a stop key which is used to stop the operation being carried out.

Reference numeral 506 denotes an interruption key which is depressed to temporarily stop the operation being carried out such that other process can be interrupted.

Figure 12:
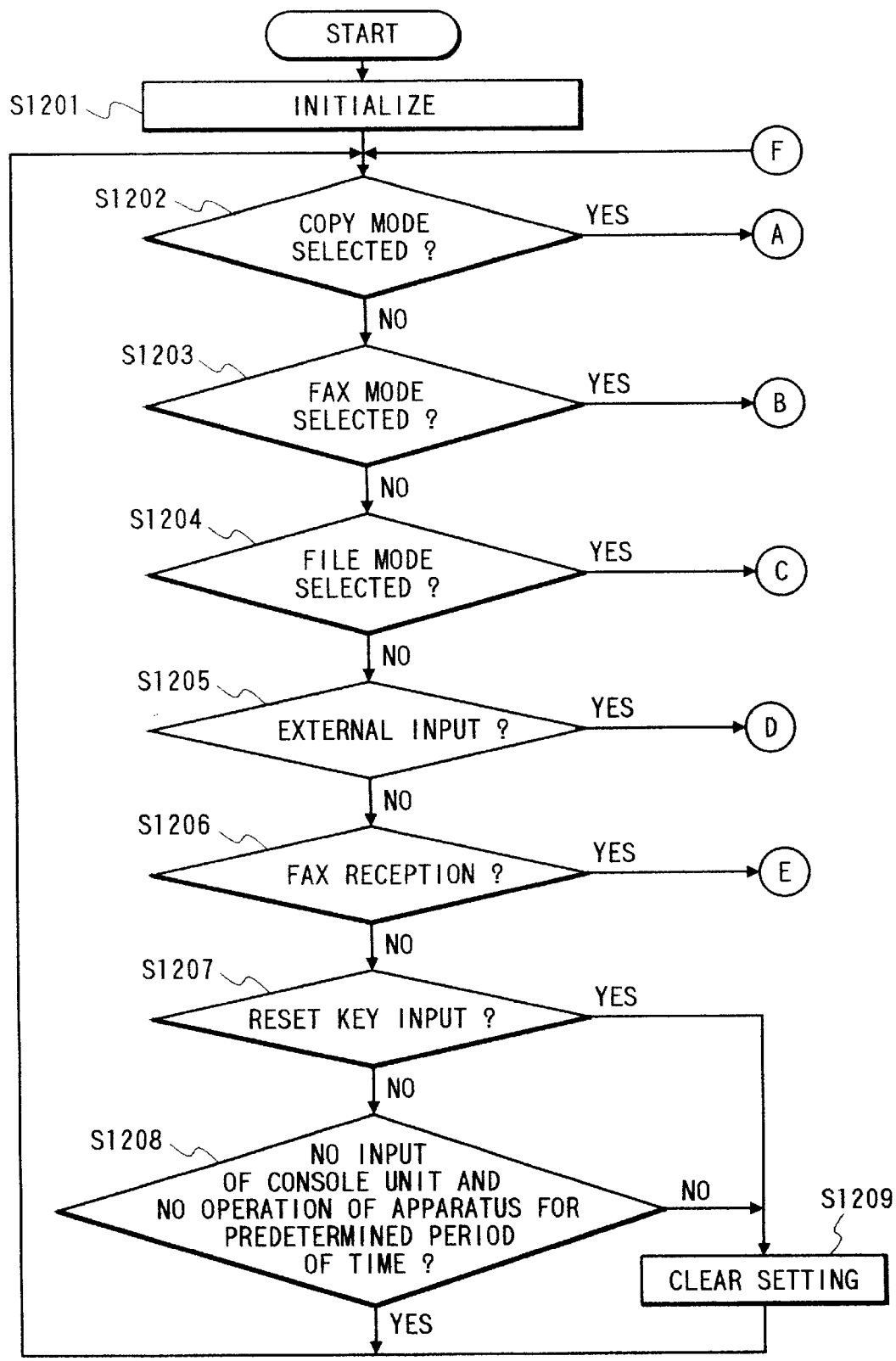
FIG. 12 is a flow chart showing a flow of a process according to the fifth embodiment of the present invention.
Figure 13:
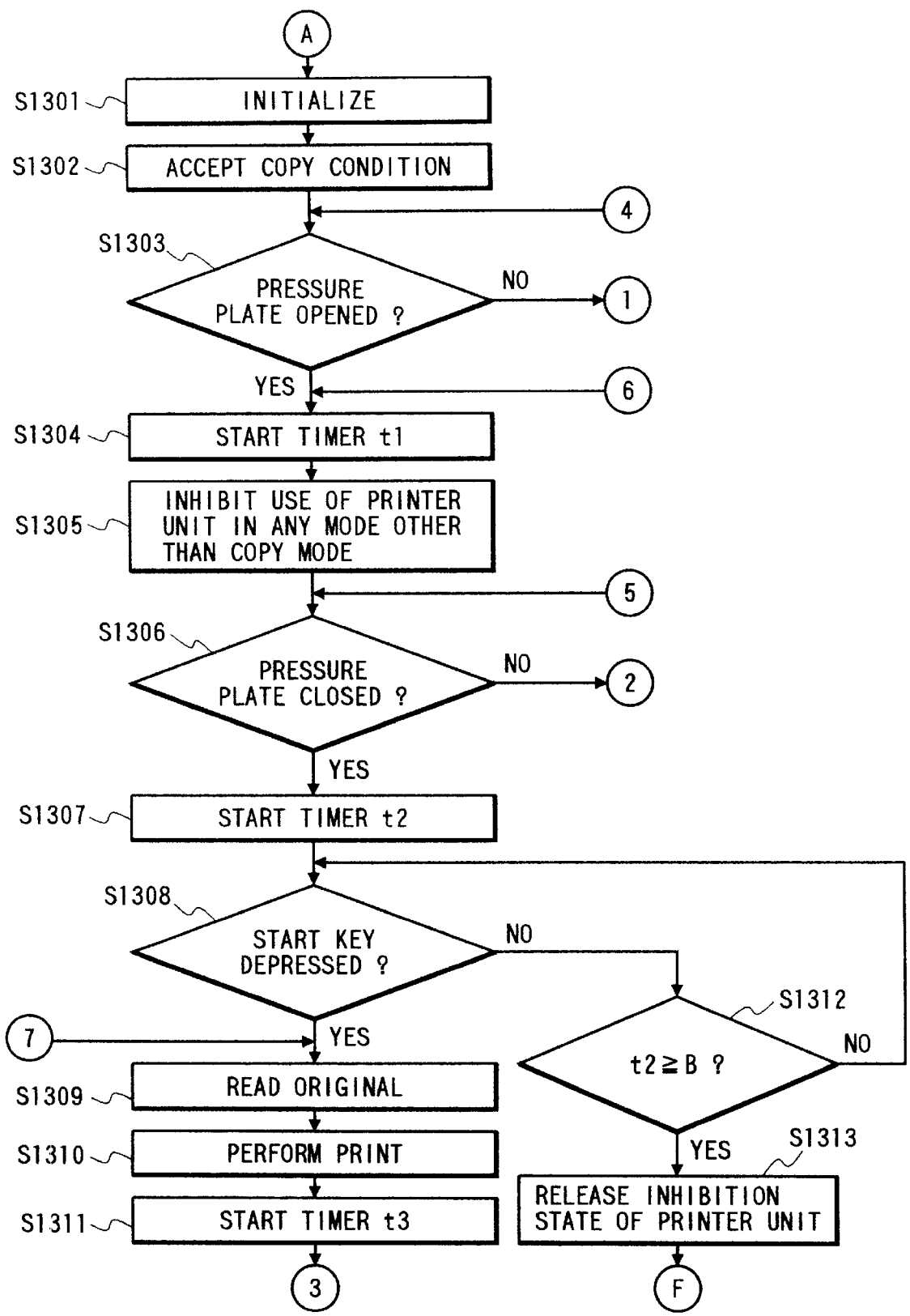
FIG. 13 is a flow chart showing a flow of the process according to the fifth embodiment of the present invention.
Figure 14:
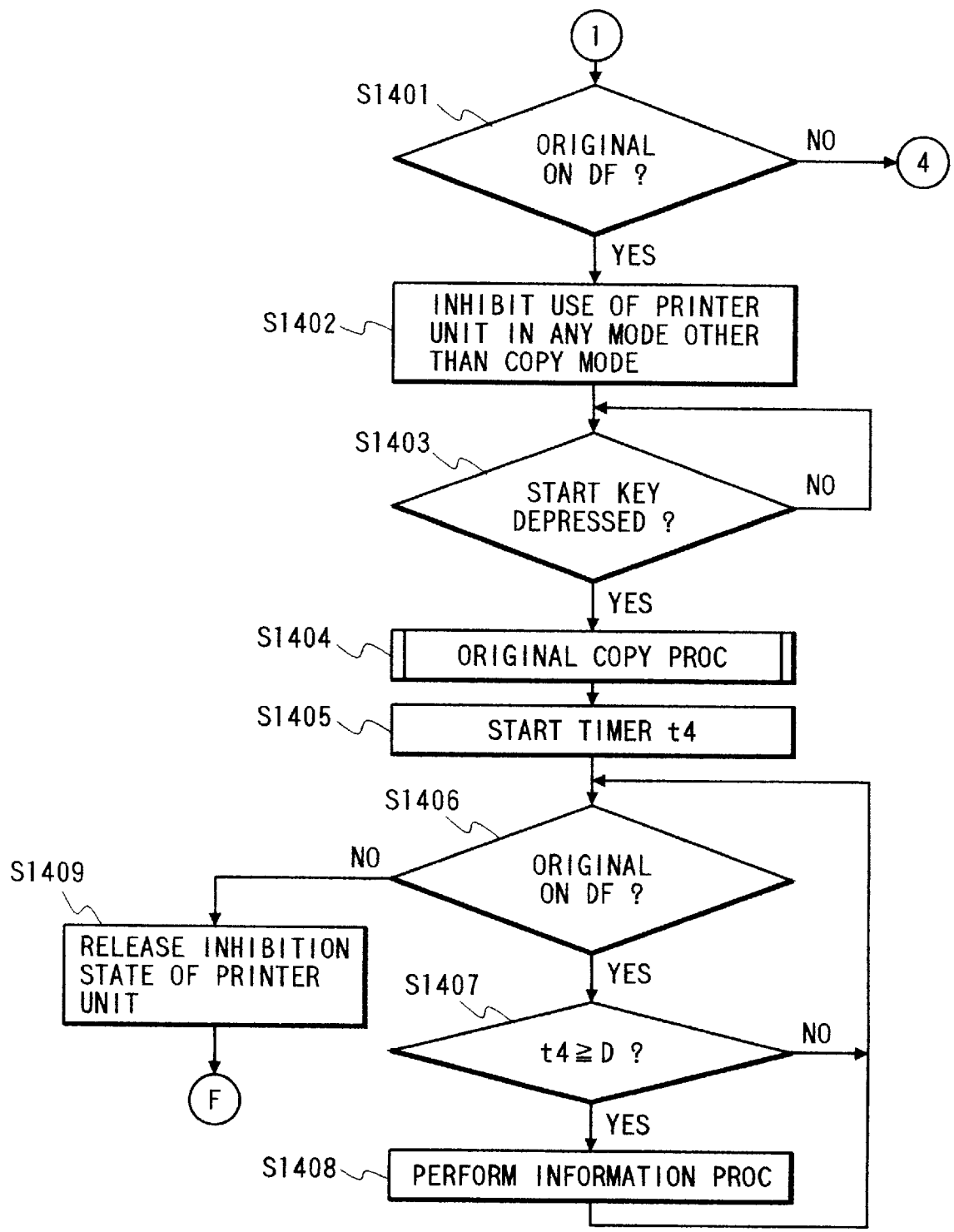
FIG. 14 is a flow chart showing a flow of the process according to the fifth embodiment of the present invention.
Figure 15:
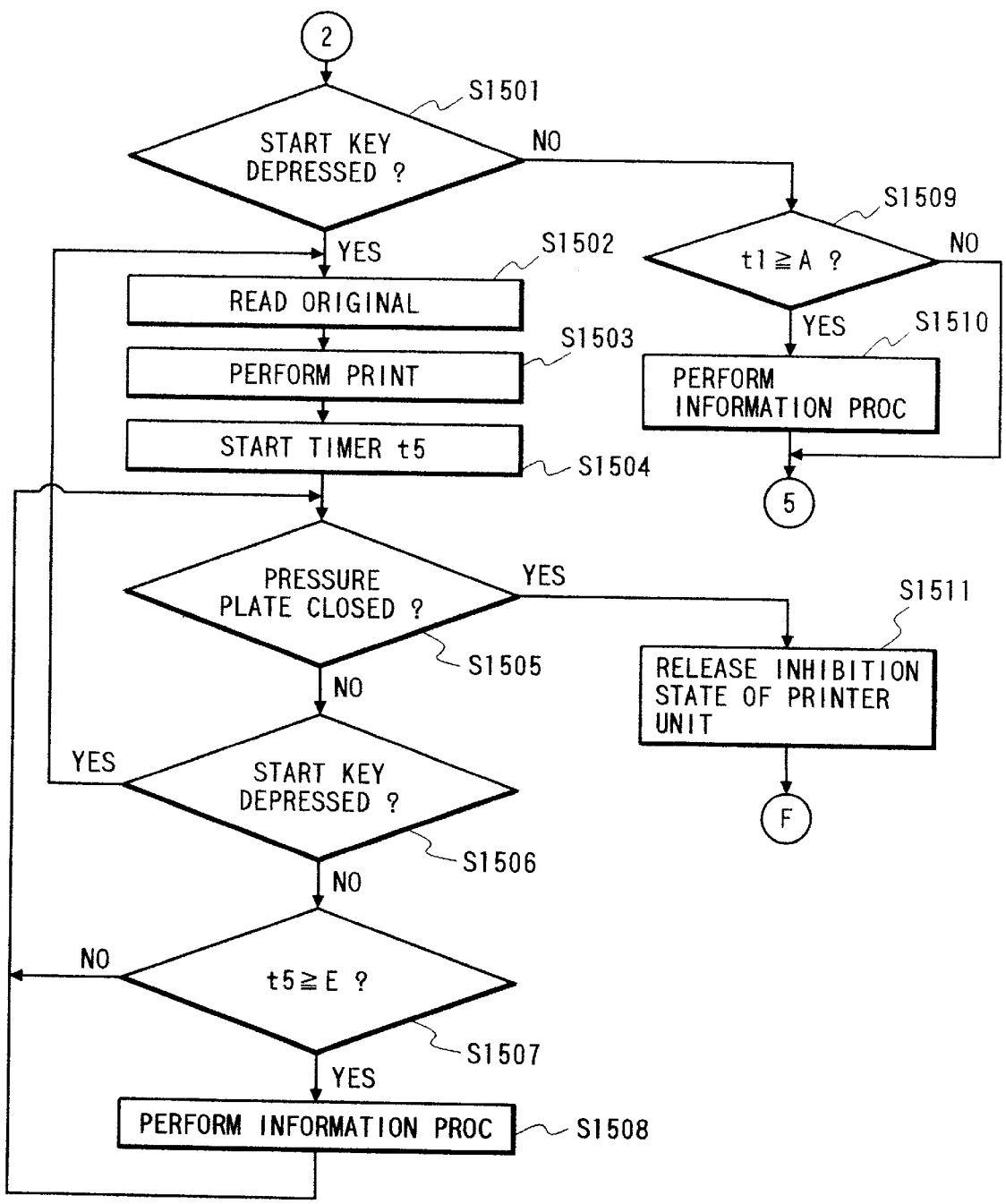
FIG. 15 is a flow chart showing a flow of the process according to the fifth embodiment of the present invention.
Figure 16:
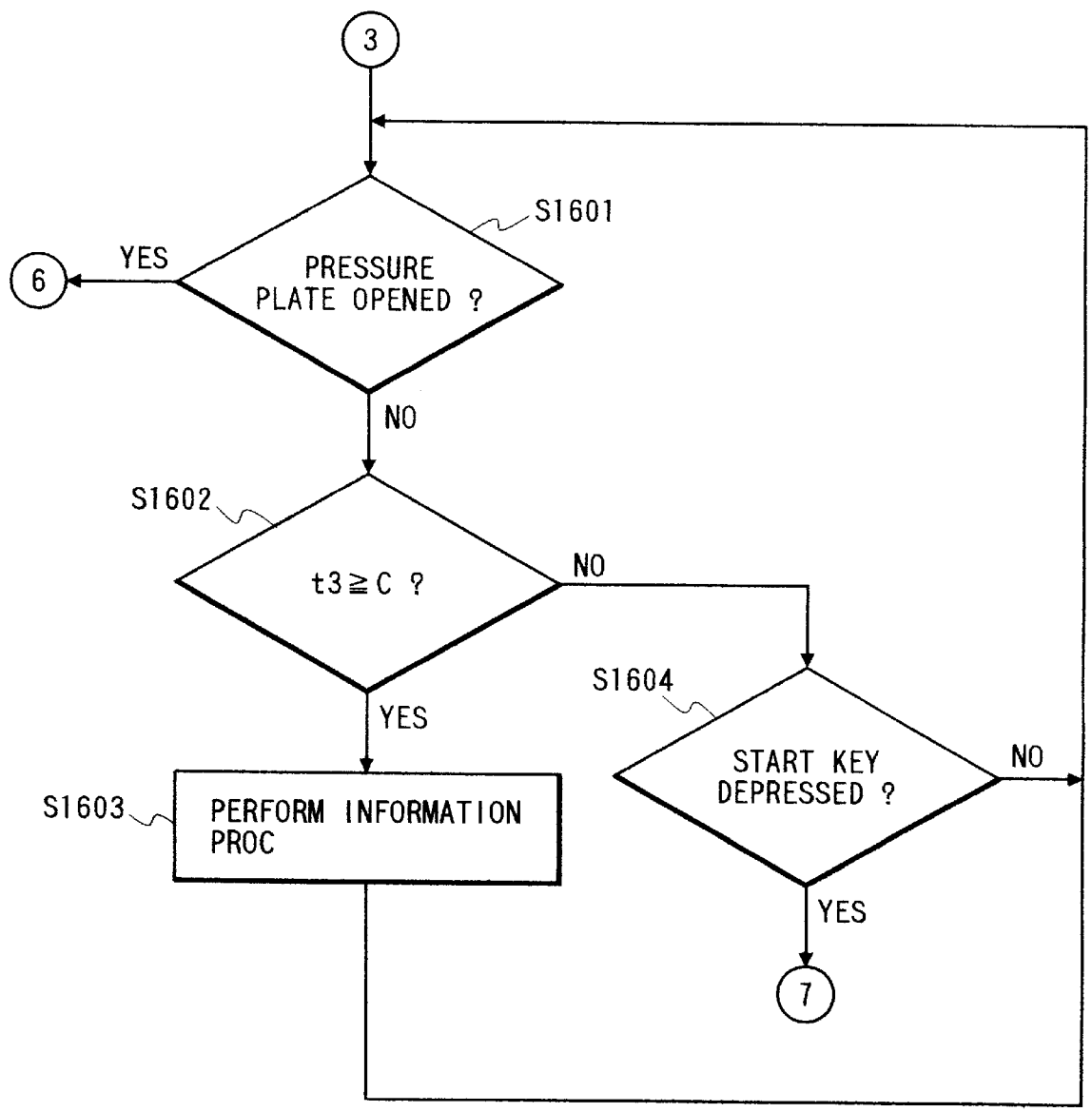
FIG. 16 is a flow chart showing a flow of the process according to the fifth embodiment of the present invention.

FIG. 12 is a flow chart showing a flow of process by the multi-function apparatus according to the fifth embodiment of the present invention. The flow chart shows a flow of the control which the CPU 1114 performs with communicating to the CPU 1123, on the basis of the program stored in the memory 1116.

When the power is turned on, in a step S1201, the apparatus is initialized as a whole, e.g., hardware setting of the image process unit 1111, display initializing of the touch panel portion 501 on the console unit 1115, setting of the scanner unit 1104 to its home position, heat starting of the fixing unit 1207 and the like. In this case, the copy mode is set as the initial mode.

Then, according to the mode selection information from the mode changeover key 5011 on the touch panel portion 501, the mode selection is performed in each of steps S1202 to S1204. If any mode is not selected by the mode changeover key 5011, it is judged in a step S1205 whether or not the data is input from the external PC/WS 1011 via the computer interface unit 1007, and in a step S1206 whether or not the facsimile data is received by the facsimile unit 1004 via the telephone line.

Further, in a step S1207, a key state of the reset key 504 is checked. If the reset key 504 is depressed, the flow advances to a step S1209 to initialize the displayed contents and the setting contents. On the other hand, it is judged in a step S1208 whether or not the data from the console unit 1115 is input and the apparatus operates for a predetermined period of time (e.g., three minutes). If it is judged that the data is not input and the apparatus does not operate, the apparatus is initialized by an auto-clear function in the step S1209. However, if it is judged that the data is input and the apparatus operates, the processes in the step S1202 to S1207 are repeated.

It should be noted that it will be explained the case where the copy mode has previously been set as the initial mode, and the process in the copy mode is managed as the most preferential process.

FIGS. 13 to 16 are flow charts showing a flow of process in the copy mode.

In a step S1301, the setting and displayed contents of the apparatus are initialized for preparing the copy mode. Then, in a step S1302, it is input from the console unit 1115 the information concerning various image processes (e.g., enlargement, reduction and the like) and copy conditions (e.g., single-surface copy, two-surface copy and the like). Such an input can be always performed, and the setting of the apparatus is performed according to the input.

It is judged in a step S1303 whether or not the pressure plate 1100 is opened. If opened, the flow advances to a step S1304, while if not opened, the flow advances to a step S1401.

In the step S1304, a timer t1 starts. In a step S1305, it is set to inhibit the printing of the image by the printer 1002 in the mode other than the copy mode.

Then, it is judged in a step S1306 whether or not the pressure plate 1100 is closed. If closed, the flow advances to a step S1307, while not closed, the flow advances to a step S1501.

In the step S1307, a timer t2 starts. Then, it is judged in a step S1308 whether or not the start key 503 is depressed. If depressed, the original which was placed on the platen glass 1102 during the steps S1303 to S1306 is scanned to read the image on the original in a step S1309. The read image is visibly output on the recording paper by the printer unit 1002, in a step S1310. After the printing by the printer 1002 terminates, a timer t3 starts in a step S1311.

On the other hand, if it is judged in the step S1308 that the start key 503 is not depressed, the flow advances to a step S1312 to judge whether or not a time counted by the timer t2 exceeds a predetermined period of time B (e.g., one minute). If the counted time exceeds the time B, the flow advances to a step S1313 to permit or authorize the printing by the printer unit 1002 in the mode other than the copy mode which was inhibited in the step S1305.

In the step S1401, it is judged whether or not the original is placed on the original feeder (DF) 1101. If placed the flow advances to a step S1402 to inhibit the printing of the image by the printer unit 1002 in the mode other than the copy mode. On the other hand, if not placed, the flow returns to the step S1303.

In a step S1403, the state of the start key 503 is observed. If the start key 503 is depressed, the flow advances to a step S1404. In this step, the original placed on the original feeder 1101 is fed page by page to the predetermined reading position, the image on the original is read, and the read image is printed out by the printer unit 1002 (the original which the reading terminated is cycled to its initial position on the original feeder 1101). Such the copy process is performed for all of the originals placed on the original feeder 1101. After the copy process terminates, a timer t4 starts in a step S1405.

In a step S1406, it is again judged whether or not the original is placed on the original feeder (DF) 1101. If not placed, the read original is considered to have been removed from the feeder 1101, and it is permitted in a step S1409 the printing by the printer 1002 in the mode other than the copy mode which was inhibited in the step S1402. On the other hand, if placed in the step S1406, the flow advances to a step S1407 to judge whether or not a time counted by the timer t4 exceeds a predetermined period of time D (e.g., one minute). If the counted time exceeds the time D, the flow advances to a step S1408 to display on the touch panel portion 501 that the original after the copy operation terminates remains and simultaneously generate an alarm sound. When such an information process in the step S1408 is performed a predetermined times or for a predetermined period of time, the flow may return to the step S1201.

In the step S1501, the state of the start key 503 is observed. If the key 503 is depressed, the flow advances to a step S1502 to read the image of the original placed on the platen glass 1102 and then print out the read image by the printer unit 1002 (step S1503). After the recording by the printer unit 1002 terminates, a timer t5 starts in a step S1504. On the other hand, if the start key 503 is not depressed, it is judged in a step S1509 whether or not a time counted by the timer t1 exceeds a predetermined period of time A (e.g., one minute). If the counted time exceeds the time A, the flow advances to a step S1510 to display on the touch panel portion 501 that the pressure plate 1100 is kept opened and simultaneously to generate the alarm sound. When such an information process is repeated predetermined times or for a predetermined period of time, the apparatus may return to the initial state (step S1201).

In a step S1505, it is judged whether or not the pressure plate 1100 is closed. If closed, it is considered that the copy operation by an operator terminates, and in a step S1511 the printing by the printer unit 1002 in the mode other than the copy mode which has been inhibited is permitted in a step S1511. If not closed, it is judged in a step S1506 whether or not the start key 503 is depressed. If depressed, the flow returns to the step S1502 to further perform the copy process. If not depressed, it is judged in a step S1507 whether or not a time counted by a timer t5 exceeds a predetermined period of time E (e.g., one minute). If the counted time exceeds the time E, the flow advances to a step S1508 to display on the touch panel portion 501 that the pressure plate 1100 is kept opened and simultaneously to generate the alarm sound. When such an information process is repeated a predetermined times or for a predetermined period of time, the apparatus may return to the initial state (step S1201). In this case, the processes in the step S1505 and the following steps are repeated until the time counted by the timer t5 exceeds the predetermined period of time E.

In a step S1601, it is judged whether or not the pressure plate 1100 is again opened. If opened, the processes in the step S1304 and the following step are again performed, while if not opened, the flow advances to a step S1602 to judge whether or not a time counted by the timer t3 exceeds a predetermined period of time C (e.g., one minute). If the counted time does not exceed the time C, it is considered that the original which the copying yet terminated remains on the platen glass 1102. Thus, it is displayed on the touch panel 501 that the original remains on the glass 1102, and simultaneously the alarm sound is generated, in a step S1603. When, such an information process is repeated a predetermined times or for a predetermined period of time, the apparatus may return to the initial state (step S1201). On the other hand, if it is judged in the step S1602 that the counted time does not exceed the time C, it is further judged in a step S1604 whether or not the start key 503 is depressed. If depressed, the flow returns to the step S1309, while if not depressed, the processes in the step S1601 and the following steps are repeated. In the above operation, when the pressure plate 1100 is being opened, it is always displayed to urge the operator to close the plate 1100.

Figure 17:
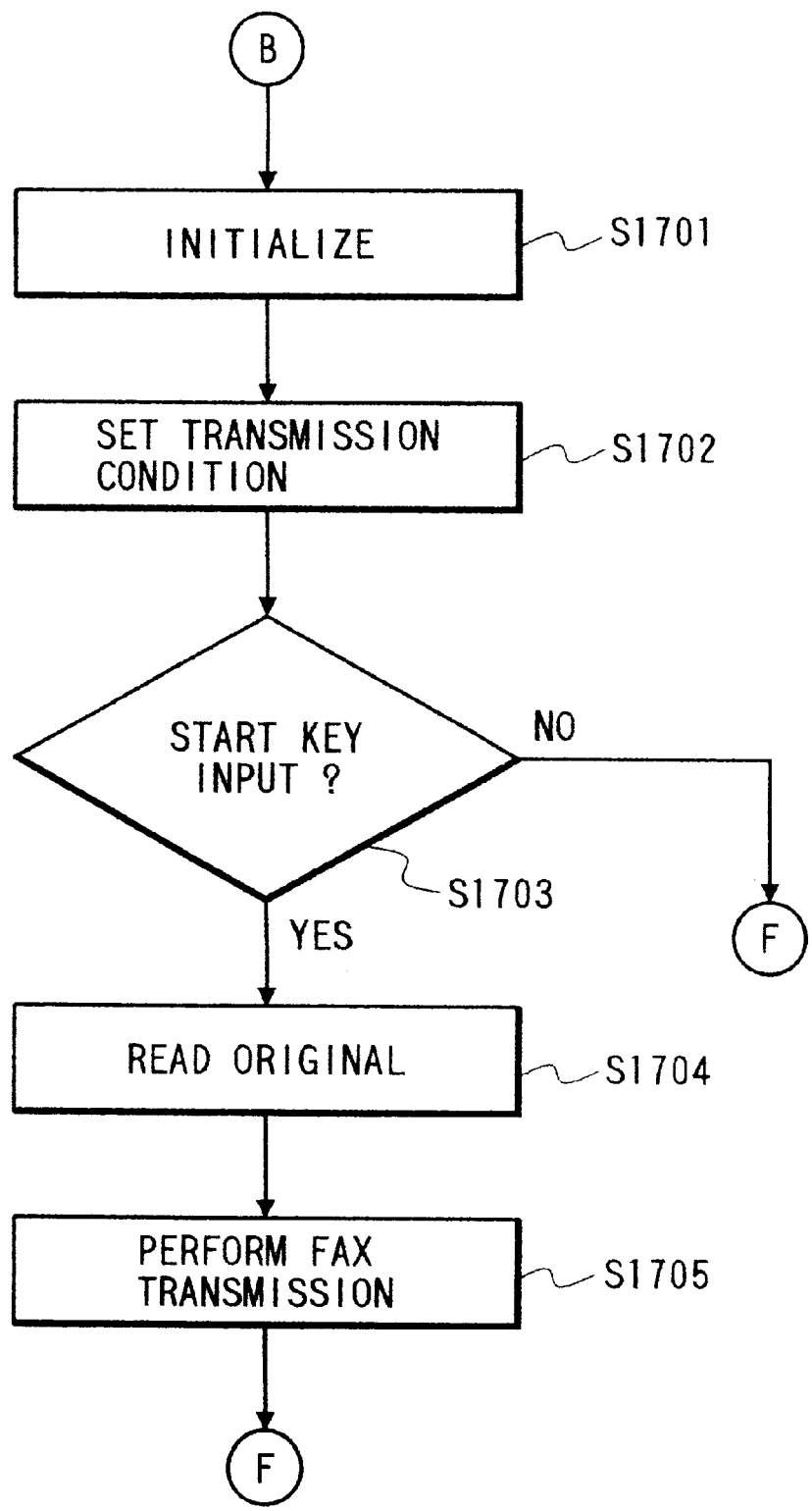
FIG. 17 is a flow chart showing a flow of the process according to the fifth embodiment of the present invention.

FIG. 17 is a flow chart showing a flow of process in a case where the facsimile mode is selected to perform the facsimile transmission.

Initially, in a step S1701, the setting contents and the displayed contents of the apparatus are initialized for the preparation of the facsimile mode. Then, in a step S1702, the setting is performed by inputting from the console unit 1115 information concerning facsimile transmission conditions such as destination telephone number, various image processes, resolution and the like.

In a step S1703, the state of the start key 503 is observed. If the key 503 is depressed, the flow advances to a step S1704 to scan the original on the platen glass 1102 and read the image of the original. Then, in a step S1705, the data based on the read image is transmitted to a communication partner or destination on the basis of the setting contents. On the other hand, if the key 503 is judged not to be depressed, the flow returns to the processes shown in FIG. 12.

Figure 18:
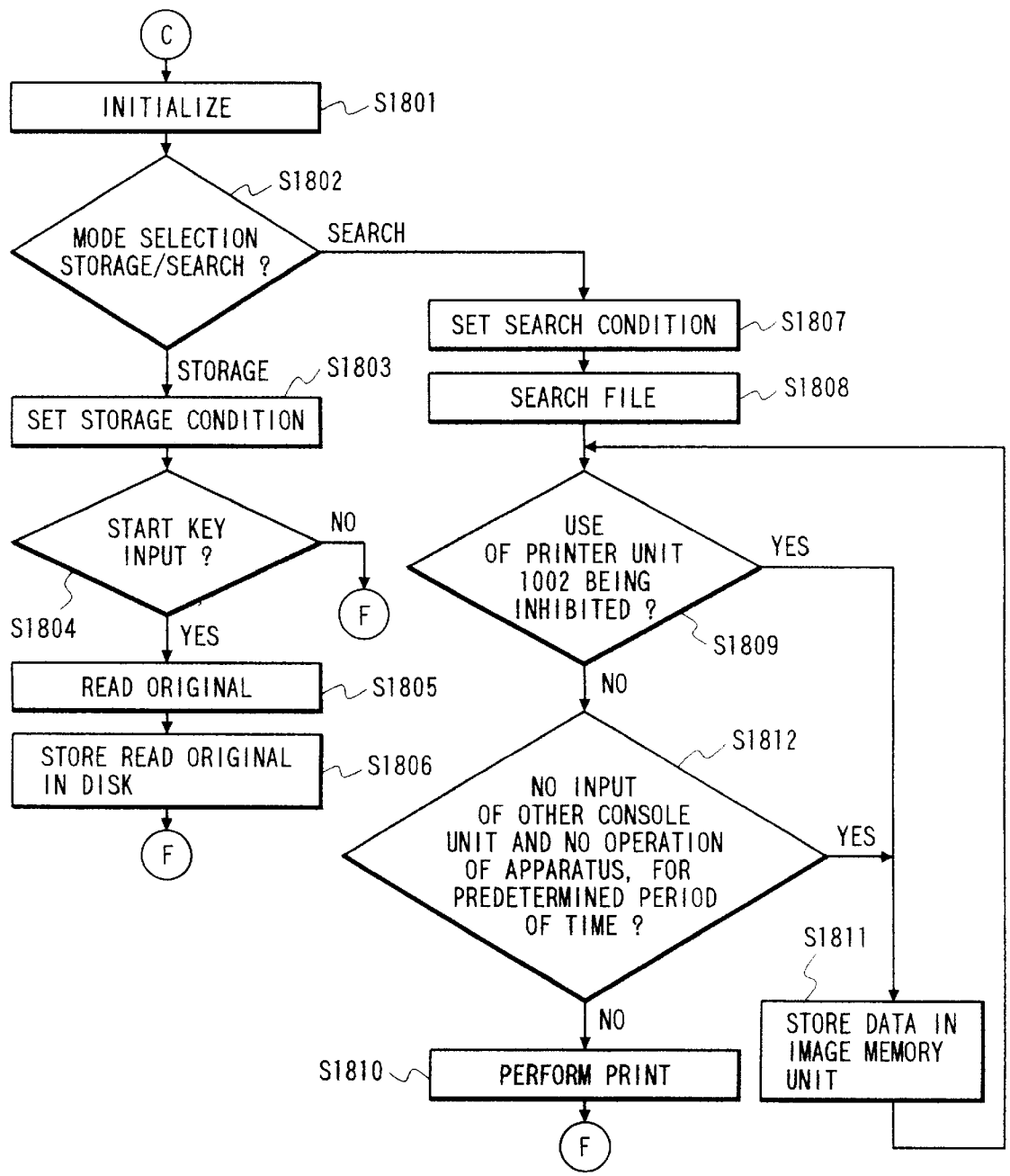
FIG. 18 is a flow chart showing a flow of the process according to the fifth embodiment of the present invention.

FIG. 18 is a flow chart showing a flow of process in a case where the file mode is selected.

In a step S1801, the setting contents and the displayed contents of the apparatus are initialized for the preparation of the file mode. Then, it is judged in a step S1802 which is selected from a storage mode and a search mode by the console unit 1115. If the storage mode is selected, the flow advances to a step S1803, while if the search mode is selected, the flow advances to a step S1807.

In the step S1803, information concerning a file storage condition is input from the console unit 1115 and the setting is performed based on the input information. Then, in a step S1804, the state of the start key 503 is observed. If the start key 503 is depressed, the flow advances to a step S1805 to scan the original on the platen glass 1102 and then read the image of the original. In a step S1806, data based on the read image is stored as a file in the optomagnetic disk mounted on the optomagnetic disk drive unit, on the basis of the contents set in the step S1803. If the start key 503 is not depressed in the step S1804, and if the storing of the image data in the optomagnetic disk terminates, the flow returns to the processes shown in FIG. 12.

In the step S1807, information concerning a file search condition is input from the console unit S1807 and the setting is performed based on the input information. Then, in a step S1808, files in the optomagnetic disk mounted on the optomagnetic disk drive unit are searched and read according to the set file search condition. In a step S1809, it is judged whether or not use of the printer unit 2 is inhibited in the file mode. If inhibited, the read data is stored in the image memory unit 1009. On the other hand, if not inhibited, in a step S1812, it is confirmed there is no input from the console unit 1115 due to other process and there is no operation of the apparatus for a predetermined period of time, and then an image of the corresponding file which was read from the optomagnetic disk or the image memory unit 1009 (stored in a step S1811) is printed out by the printer unit 1002 in a step S1810. While the image recording is being performed in the step S1810, the use of the printer unit 1002 for other process is inhibited. After the recording terminates, the flow returns to the processes shown in FIG. 12.

Figure 19:
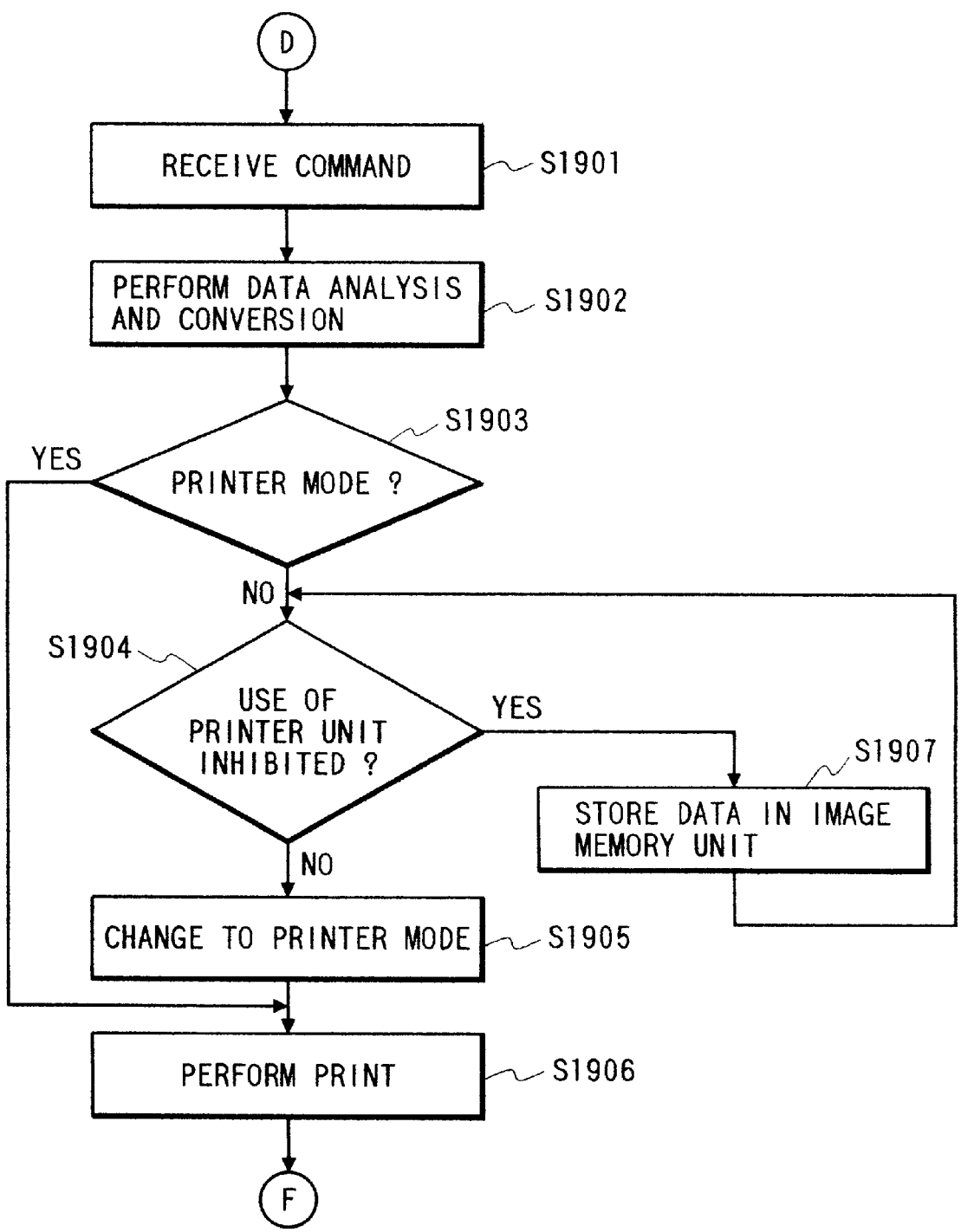
FIG. 19 is a flow chart showing a flow of the process according to the fifth embodiment of the present invention.

FIG. 19 is a flow chart showing a flow of process in a case where the data is input from the external PC/WS 1011 via the computer interface unit 7.

In a step S1901, a command (including data representing the image) transmitted from the PC/WS 1011 is received. Then, in a step S1902, the received data is analyzed, and code data is developed into bit-mapped image data by the formatter unit 1008.

In a step S1903, it is judged whether or not the printer mode is selected. If the printer mode is selected, the flow advances to a step S1907, while if the mode other than the printer mode is selected, the flow advances to a step S1904. In the step S1904, it is judged whether or not the use of the printer unit 1002 is inhibited in the printer mode. If inhibited, the flow advances to the step S1907 to store the image data based on the data received from the PC/WS 1011 into the image memory unit 1009. On the other hand, if not inhibited, the flow advances to a step S1905 to change the mode to the printer mode.

In a step S1906, the image based on the data from the PC/WS 1011 (also including the data stored in the image memory unit 1009 in the step S1907) is printed out by the printer unit 1002. While the image is being recorded in the step S1906, the use of the printer unit 1002 is inhibited for other process. Then, after the image recording terminates, the flow returns to the processes shown in FIG. 12.

Figure 20:
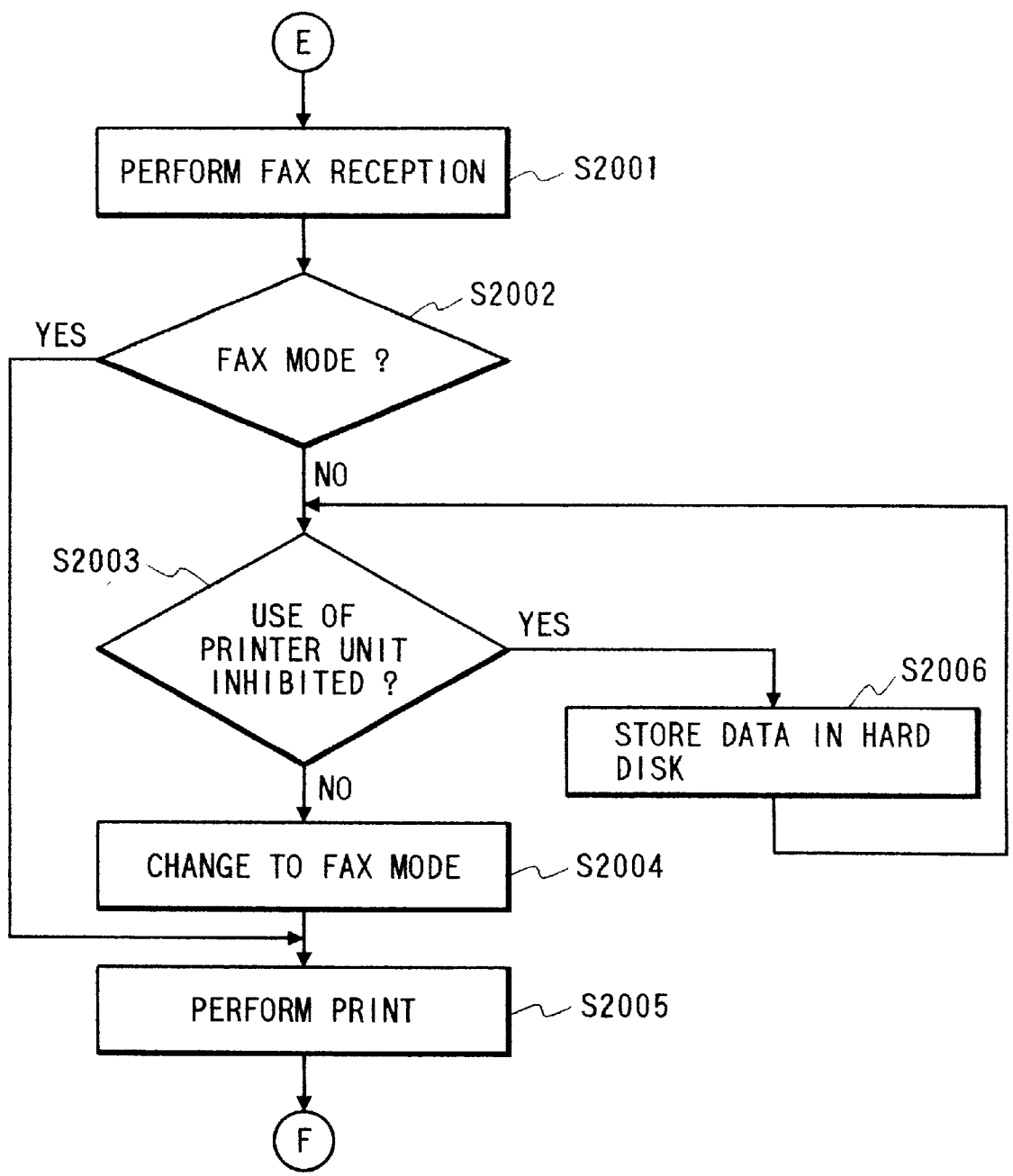
FIG. 20 is a flow chart showing a flow of the process according to the fifth embodiment of the present invention.

FIG. 20 is a flow chart showing a flow of process in a case where the facsimile unit 1004 receives the facsimile data via the telephone line.

In a step S2001, the data from a communication partner is received via the telephone line, and the received data is decoded by the facsimile unit 1004 to be developed into the image data.

In a step S2002, it is judged whether or not the facsimile mode is selected. If selected, the flow advances to a step S2005. On the other hand, if the mode other than the facsimile mode is selected, the flow advances to a step S2003. In the step S2003, it is judged whether or not the use of the printer unit 1002 is being inhibited in the facsimile mode. If inhibited, the flow advances to a step S2006 to store the received data into the hard disk 1012, while if not inhibited, the flow advances to a step S2004. In the step S2004, the mode is changed to the facsimile mode so as to print out the received data.

In a step S2005, the image based on the received data (also including the data stored in the hard disk 1012 in the step S2006) is printed out by the printer unit 1002. While the image is being recorded in the step S2005, the use of the printer unit 1002 is inhibited. Then, after the image recording terminates, the flow returns to the processes shown in FIG. 12.

In the present embodiment, a predetermined common setting value is used as the predetermined period of times in the steps S1208, S1312, S1407, S1507, S1509, S1602 and S1812. However, in order to further improve operationability, a desired period of time may be set by the operator via the key inputting from the console unit 1115. Further, such the time may be set independently for each function. Furthermore, if the step to check the predetermined period of time is set as a through step responsive to an operation of a predetermined key such as reset key, "#" key or the like, so as to provide a mode that the printing can immediately be performed, the printer unit 1002 can further effectively be used. Furthermore, in the case where the printer unit 1002 is being used, it may be displayed on the touch panel portion 501 which function uses the printer unit 1002.

In the present embodiment, it is conditioned in the steps S1208 and S1812 that all of the keys on the console unit 1115 are not used or operated for the predetermined period of time. However, it may be conditioned that a part of the keys or the keys concerning the predetermined functions are not used or operated for the predetermined period of time. Further, in the present invention, it is used as a reference a time when the key inputting is finally performed on the console unit 1115 is used. However, other time such as a time when the paper passes through the discharge unit may be used as the reference. This is because, in some functions, e.g., two-surface copy function and the like, it is necessary a relatively long period of time from the final key operation on the console unit 1115 to the printing termination.

According to the present embodiment, while the main body is being operated directly, e.g., the copying, the reading of the image in the memory, the printing or the like, the print unit is never used by other function, e.g., the facsimile reception function. Therefore, it is not occurred such problems as user's working is interrupted, the output papers are erroneously picked up, and the like, whereby excellent operationability can be obtained.

Sixth Embodiment

In the sixth embodiment described hereinafter, it is Judged by a more simple controlling whether or not an operator is performing a copying (including an exchanging of an original), so as to set permission and inhibition of a printing of received data. In this case, it will be explained a case where facsimile data is received.

Figure 21:
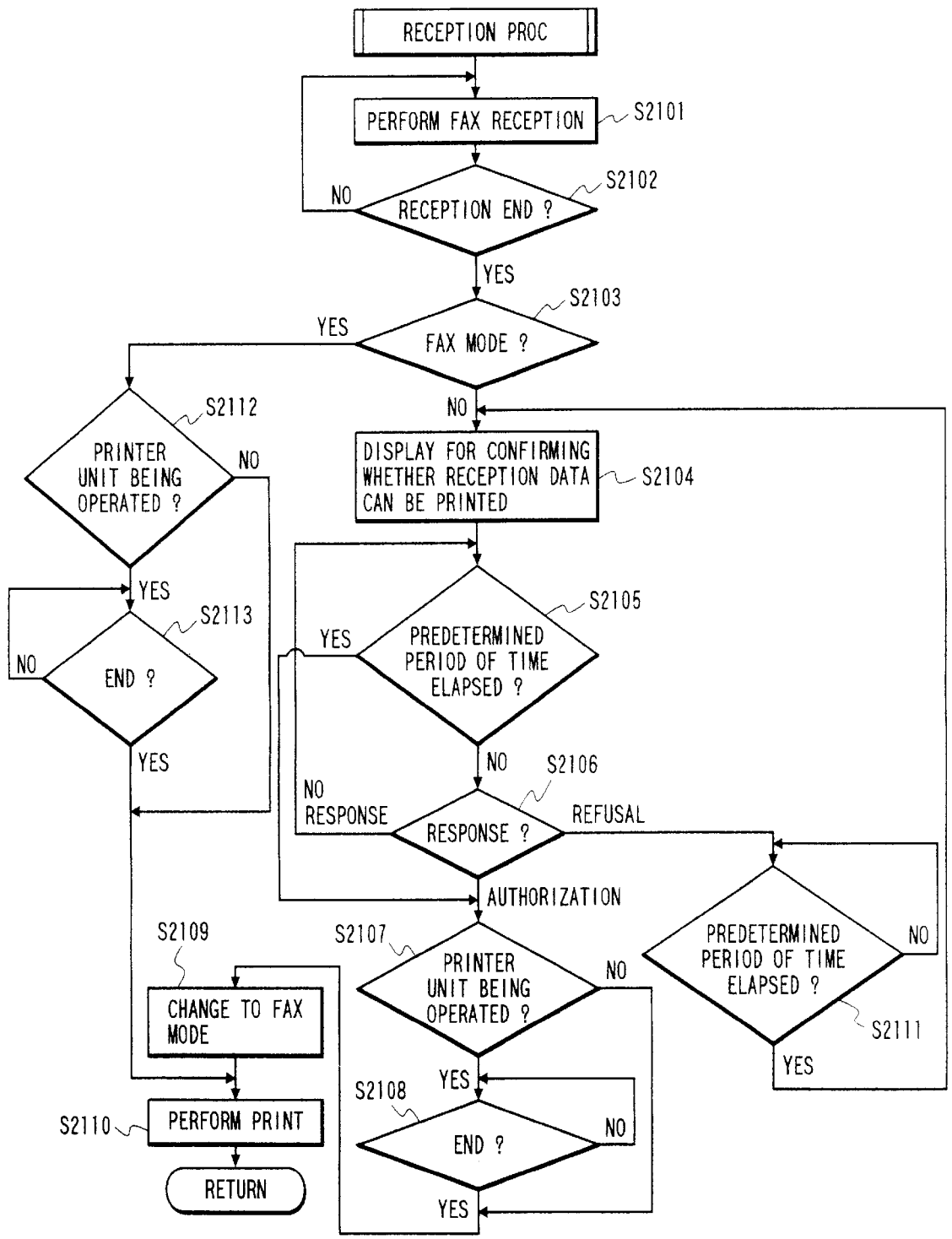
FIG. 21 is a flow chart showing a flow of a process according to the sixth embodiment of the present invention.

FIG. 21 is a flow chart showing a flow of process in the present embodiment (i.e., a case where the facsimile data is received from a communication partner).

In a step S2101, data from the communication partner is received via a telephone line, and the received data is sequentially stored in a hard disk 1012. In this case, a touch panel portion 501 displays that the facsimile reception is being performed.

If it is judged in a step S2102 that the reception terminates, the flow advances to a step S2103 to judge whether or not a facsimile mode is selected. If selected, the flow advances to a step S2112, while if not selected, the flow advances to a step S2104.

In the step S2104, an alarm sound is generated, and also the touch panel portion 501 displays a message "Facsimile data is received. Can printing start?" or the like for an operator's confirmation. Simultaneously, the touch panel portion 501 displays further items "Yes" and "No", so that operator's intention is represented by depressing either one of these items. Then, it is judged in a step S2106 whether or not either one of these items "Yes" and "No" is depressed. If "Yes" is depressed, it is considered that the operator permits the printing of the received data, and the flow advances to a step S2107. On the other hand, if "No" is depressed, it is considered that the operator refuses the printing of the received data, and the flow advances to the step S2111.

In a step S2105, it is judged whether or not a predetermined period of time (e.g., 30 seconds) is elapsed after the display was performed in the step S2104. If there is no response (permission or refusal) within the predetermined period of time, it is considered that the operator is not performing the copy operation, the flow advances to the step S2107.

In the step S2111, it is judged whether or not a predetermined period of time (e.g., three minutes) is elapsed after the touching at the item "No" on the touch panel portion 501 in the step S2106. If elapsed, the flow returns to the step S2104 to again display the confirmation whether or not the received data can be printed out. In this case, if the item "No" is touched in the step S2106, it is set that the received data is inhibited to be printed out by the printer unit 1002.

In the step S2107, it is judged whether or not the printer unit 1002 is being operated for printing out other data. If it is Judged in a step S2108 that the printing terminates, the flow advances to a step S2109 to change the mode to the facsimile mode. Then, the flow advances to a step S2110.

If the facsimile mode is selected in the step S2103, the flow advances to the step S2112 to judge whether or not the printer unit 1002 is operating for printing out other data in the same manner as in the step S2107. If it is judged in a step S2113 that the printing terminates, the flow advances to the step S2110.

In the step S2110, the received data is read out of the hard disk 1012 and then printed out as a visible image by the printer unit 1002. When the printing terminates, the image in the hard disk 1012 is deleted and the multi-function apparatus returns to a stand-by state.

In the above-described embodiment, it can be exactly judged whether or not the operator is working, e.g., copying or the like in front of the apparatus. Therefore, it can be prevented that such operator's work is interrupted. Further, if the operator is not working, the received data is printed out and then deleted from the hard disk, so that so-called a memory-full state can be prevented.

FIGS. 12 to 21 illustrate the flow of process in the case where a CPU 1114 performs the controlling on the basis of a program stored in a memory 1116. However, data representing this program is stored in a detachable memory, e.g., floppy disk or the like, so that such the data can be applied to other apparatus capable of reading it.

The CPU 1114 controls the entire apparatus with communicating to a CPU 1123 (controlled based on a program stored in a memory 1124). However, such a control can be achieved only by a single CPU.

The present invention may be applied to a system constituted by a plurality of apparatuses (e.g., a host computer, an interface equipment, a reader, a printer and the like) or to a system constituted by a single apparatus (e.g., a copy machine, a facsimile or the like).

The scope of the present invention also includes a system or an apparatus of which computer (CPU or MPU) runs to operate various devices connected thereto in accordance with software program codes supplied to the system or apparatus, so as to realize the functions of the above embodiments.

In this case, the software program codes themselves realize the embodiment function. Therefore, the program codes themselves and means for supplying such the program codes to the computer, e.g., a storage medium storing such the program codes, constitute the present invention.

The storage medium storing such the program codes may be a floppy disk, a hard disk, an optical disk, an optomagnetic disk, a CD-ROM, a magnetic tape, a non-vilatile memory card, a ROM or the like.

Obviously, such the program codes are other types of embodiments of the present invention, not only for the case wherein the embodiment functions are realized by executing the program codes supplied to the computer but also for the case wherein the embodiment functions are realized by the program codes used with an OS (operating system) on which the computer runs or with other various types of application software.

Furthermore, the scope of the present invention also includes obviously the case where in accordance with the program codes stored in a memory of a function expansion board or unit connected to the computer supplied with the program codes, a CPU or the like of the function board or unit executes part or the whole of the actual tasks for realizing the embodiment functions.

As explained above, the present invention can cope with the concurrence of the plurality of processes, thereby eliminating the inconvenience that, e.g., the operator who is just working must wait to further prosecute his work.

The present invention has been explained by the preferred embodiments thereof, but the present invention is by no means limited to such embodiments and is subjected to various modifications within the scope and spirit of the appended claims.

What is claimed is:

1. An image processing apparatus comprising:
   a pressure plate for pressing an original placed on an original support plate;
   read means for reading an image of the original on the original support plate;
   reception means for receiving data representing an image;
   record means for recording images based on the image read by said read means and the data received by said reception means;

detection means for detecting open/close of said pressure plate; and changeover means for changing between a first mode and a second mode, the first mode being to record by using said record means the image based on the image read by said read means, and the second mode being to record by using said record means the image based on the data received by said reception means, wherein said changeover means changes, in a case where the data is received by said reception means while the first mode is set, the first mode to the second mode if there is no operation in the first mode for a predetermined period of time following the detection by said detection means of closure of said pressure plate.

2. An apparatus according to claim 1, wherein said changeover means does not change, in the case where the data is received by said reception means while the first mode is set, the first mode to the second mode if it is detected by said detection means that said pressure plate is opened.

3. An according to claim 1, wherein said changeover means does not change, in the case where the data is received by said reception means while the first mode is set, the first mode to the second mode if a process in the first mode is being performed.

4. An image processing apparatus comprising:

read means for reading an image of an original;

reception means for receiving data representing an image;

record means for recording images based on the image read by said read means and the data received by said reception means;

changeover means for changing between a first mode and a second mode, the first mode being to record by using said record means the image based on the image read by said read means, and the second mode being to record by using said record means the image based on the data received by said reception means; and confirmation means for inquiring to an operator whether or not recording of the image based on the data by said record means should be authorized, when the data is received by said reception means in a case where the first mode is set, wherein said changeover means changes, based on a response to the inquiry by said confirmation means, the first mode to the second mode.

5. An apparatus according to claim 4, wherein based on the response to the inquiry by said confirmation means, said changeover means does not change the first mode to the second mode when it is instructed not to authorize the recording of the image based on the data, and said confirmation means again inquires about the recording after a predetermined period of time has elapsed from the instruction not to authorize the recording.

6. An apparatus according to claim 4, wherein based on the response to the inquiry by said confirmation means, said changeover means changes the first mode to the second mode when there is no instruction after a predetermined period of time has elapsed.

7. An image processing apparatus comprising:

a pressure plate for pressing an original placed on an original support plate;

read means for reading an image of the original on the original support plate;

reception means for receiving data representing an image;

record means for recording images based on the image read by said read means and the data received by said reception means;

detection means for detecting open/close of said pressure plate; and control means for controlling said record means such that recording by said record means of the image based on the data received by said reception means is inhibited while it is detected by said detection means that said pressure plate is opened.

8. An apparatus according to claim 7, further comprising:

operation means for inputting a manual instruction; and information means for informing an operator that there has been no manual instruction from said operation means after a predetermined period of time has elapsed from the detection by said detection means that said pressure plate is opened.

9. An image processing apparatus comprising:

read means for reading an image of an original;

reception means for receiving data representing an image;

record means for recording images based on the image read by said read means and the data received by said reception means;

detection means for detecting presence/absence of the original; and control means for controlling said record means such that recording by said record means of the image based on the data received by said reception means is inhibited in response to a detection by said detection means that indicates that the original is present.

10. An apparatus according to claim 9, further comprising an original feeder for feeding the placed original to a read position of said read means, and wherein said detection means detects the presence/absence of the original in accordance with whether or not the original is placed on said original feeder.

11. An apparatus according to claim 9, wherein said detection means detects the presence/absence of the original on an original support plate on which the original to be read by said read means is placed.

12. An apparatus according to claim 9, further comprising information means for informing an operator when it is detected by said detection means that an original which was already read by said read means is present.

13. An image processing apparatus comprising:

read means for reading an image of an original on an original support plate;

reception means for receiving data;

output means for outputting the image read by said read means and an image based on the data received by said reception means;

detection means for detecting open/close operations of a pressure plate which presses the original on the original support plate; and changeover means for changing between a first mode and a second mode, the first mode being to output by said output means the image read by said read means, and the second mode being to output by said output means the image based on the data received by said reception means, wherein said changeover means changes between the first mode and the second mode on the basis of a detection result of said detection means.

14. An apparatus according to claim 13, wherein said detection means detects the open/close operation of the pressure plate on the basis of a state of a sensor which detects a light.

15. An apparatus according to claim 13, further comprising original detection means for detecting presence/absence of the original on the original support plate, and wherein said changeover means changes the first mode and the second mode on the basis of a detection result of said original detection means.

16. An apparatus according to claim 15, wherein said original detection means detects a size of the original.

17. A control method of an image processing apparatus, comprising:

a read step of reading an image of an original;

a reception step of receiving data representing an image;

an output step of outputting images based on the image read in said read step and the data received in said reception step;

a detection step of detecting presence/absence of the original; and an inhibition step of inhibiting the output of the image based on the data received in said reception step in response to a detection in said detection step that indicates that the original is present.

18. A method according to claim 17, wherein the presence/absence of the original is detected in said detection step in accordance with whether or not the original is placed on an original feeder which feeds the placed original to a read position in said read step.

19. A method according to claim 17, wherein it is detected in said detection step the presence/absence of the original on an original support plate on which the original to be read in said read step is placed.

20. A method according to claim 17, further comprising an information step of informing an operator that it is detected in said detection step that an original which was already read in said read step is present.

21. An image processing method comprising:

a read step of reading an image of an original on an original support plate;

a reception step of receiving data;

an output step of outputting the image read in said read step and an image based on the data received in said reception step;

a detection step of detecting open/close operations of a pressure plate which presses the original on the original support plate; and a changeover step of changing between a first mode and a second mode, the first mode being to output in said output step the image read in said read step, and the second mode being to output in said output step the image based on the data received in said reception step, wherein said changeover step changes between the first mode and the second mode on the basis of a detection result in said detection step.

22. A method according to claim 21, wherein said detection step detects the open/close operation of the pressure plate on the basis of a state of a sensor which detects a light.

23. A method according to claim 21, further comprising an original detection step of detecting presence/absence of the original on the original support plate, and wherein said changeover step changes the first mode and the second mode on the basis of a detection result in said original detection step.

24. An image processing apparatus comprising:

a reader;

discrimination means for discriminating whether a physical state of said reader is a first state or a second state;

reception means for receiving data representing an image;

a printer;

changing means for changing between a first mode and a second mode, the first mode being to print by using said printer the image based on the image obtained by said reader, and the second mode being to print by using said printer the image based on the data received by said reception means; and control means for controlling a changing operation of said changing means based on a discrimination result by said discrimination means when said reception means receives the data in the first mode.

25. An apparatus according to claim 24, wherein said discrimination means discriminates based on a state of an optical sensor provided in said reader whether the first state or the second state is set, such that if the first state is set, said discrimination means indicates that there is an original on said reader, and if the second state is set, said discrimination means indicates that there is no original on said reader.

26. An apparatus according to claim 24, wherein said control means determines based on a discrimination result by said discrimination means whether an operator has instructed the first mode, and controls the changing operation of said changing means based on that determination result.

27. An apparatus according to claim 24, wherein in a case where said discrimination means discriminates the first state, said control means controls said changing means not to change the first mode into the second mode.

28. An apparatus according to claim 27, wherein in a case where there is no operation for the first mode for a predetermined time period after said control means discriminates the first state by said discrimination means, said control means controls said changing means to change the fist mode into the second mode.

29. An apparatus according to claim 24, wherein said control means controls said changing means to provide priority to a process for the first mode.

30. An image processing apparatus having a copying function and a facsimile function, comprising:

setting means for selectively setting one of a copy mode for performing the copying function and a facsimile mode for performing the facsimile function;

a reader;

operating means for entering a manual instruction;

determination means for determining whether the manual instruction entered by said operating means is for the copy function or the facsimile function, when an original is set in said reader; and control means for controlling a mode set by said setting means based on a determination result by said determination means.

31. An apparatus according to claim 30, wherein in a case where said determination means determines that dial information is entered by said operating means, said control means controls said setting means so that the facsimile mode is set.

32. An apparatus according to claim 30, wherein in a case where said determination means determines that more than a predetermined number of digit keys of said operating means are entered, said control means controls said setting means so that the facsimile mode is set.

33. An apparatus according to claim 30, wherein in a case where said determination means determines that an instruction for the copy function is entered, said control means controls said setting means so that the copy mode is set to prevent data received by the facsimile function from being output for a predetermined time period.

34. A control method for an image processing apparatus that includes a pressure plate for pressing an original placed on an original support plate, read means for reading an image of the original on the original support plate, reception means for receiving data representing an image, and record means for recording images based on the image read by the read means and the data received by the reception mean, said method comprising the steps of:

detecting open/close of the pressure plate; and changing over between a first mode and a second mode, the first mode being to record by using the record means the image based on the image read by the read means, and the second mode being to record by using the record means the image based on the data received by the reception means, wherein said changeover step changes, in a case where the data is received by the reception means while the first mode is set, the first mode to the second mode if there is no operation in the first mode for a predetermined period of time following the detection at said detection step of closure of the pressure plate.

35. A method according to claim 34, wherein said changeover step does not change, in the case where the data is received by the reception means while the first mode is set, the first mode to the second mode if it is detected at said detection step that the pressure plate is opened.

36. A method according to claim 34, wherein said changeover step does not change, in the case where the data is received by the reception means while the first mode is set, the first mode to the second mode if a process in the first mode is being performed.

37. A control method in an image processing apparatus that includes read means for reading an image of an original, reception means for receiving data representing an image and record means for recording images based on the image read by the read means and the data received by the reception means, said method comprising the steps of:

changing over between a first mode and a second mode, the first mode being to record by using the record means the image based on the image read by the read means, and the second mode being to record by using the record means the image based on the data received by the reception means; and confirming, by inquiring to an operator, whether or not recording of the image based on the data by the record means should be authorized, when the data is received by the reception means in a case where the first mode is set, wherein said changeover step changes, based on a response to the inquiry at said confirmation step, the first mode to the second mode.

38. A method according to claim 37, wherein based on the response to the inquiry at said confirmation step, said changeover step does not change the first mode to the second mode when it is instructed not to authorize the recording of the image based on the data, and said confirmation step again inquires about the recording after a predetermined period of time has elapsed from the instruction not to authorize the recording.

39. A method according to claim 37, wherein based on the response to the inquiry at said confirmation step, said changeover step changes the mode to the second mode when there is no instruction after a predetermined period of time has elapsed.

40. A control method for an image processing apparatus that includes a pressure plate for pressing an original placed on an original support plate, read means for reading an image of the original on the original support plate, reception means for receiving data representing an image, and record means for recording images based on the image read by the read means and the data received by the reception means, said method comprising the steps of:

detecting open/close of the pressure plate; and controlling the record means such that recording by the record means of the image based on the data received by the reception means is inhibited while it is detected at said detection step that the pressure plate is opened.

41. A method according to claim 40, further comprising the steps of:

inputting a manual instruction; and informing an operator that there has been no manual instruction at said input step after a predetermined period of time has elapsed from the detection at said detection step that the pressure plate is opened.

42. A computer readable storage medium that stores codes for performing a control method for an image processing apparatus that includes a pressure plate for pressing an original placed on an original support plate, read means for reading an image of the original on the original support plate, reception means for receiving data representing an image, and record means for recording images based on the image read by the read means and the data received by the reception mean, said method comprising the steps of:

detecting open/close of the pressure plate; and changing over between a first mode and a second mode, the first mode being to record by using the record means the image based on the image read by the read means, and the second mode being to record by using the record means the image based on the data received by the reception means, wherein said changeover step changes, in a case where the data is received by the reception means while the first mode is set, the first mode to the second mode if there is no operation in the first mode for a predetermined period of time following the detection at said detection step of closure of the pressure plate.

43. A computer readable storage medium that stores codes for performing a control method in an image processing apparatus that includes read means for reading an image of an original, reception means for receiving data representing an image and record means for recording images based on the image read by the read means and the data received by the reception means, said method comprising the steps of:

changing over between a first mode and a second mode, the first mode being to record by using the record means the image based on the image read by the read means, and the second mode being to record by using the record means the image based on the data received by the reception means; and confirming, by inquiring to an operator, whether or not recording of the image based on the data by the record means should be authorized, when the data is received by the reception means in a case where the first mode is set, wherein said changeover step changes, based on a response to the inquiry at said confirmation step, the first mode to the second mode.

44. A computer readable storage medium that stores codes for performing a control method for an image processing apparatus that includes a pressure plate for pressing an original placed on an original support plate, read means for reading an image of the original on the original support plate, reception means for receiving data representing an image, and record means for recording images based on the image read by the read means and the data received by the reception means, said method comprising the steps of:

detecting open/close of the pressure plate; and controlling the record means such that recording by the record means of the image based on the data received by the reception means is inhibited while it is detected at said detection step that the pressure plate is opened.

45. A computer readable storage medium that stores codes for performing a control method of an image processing apparatus that includes read means for reading an image of an original, reception means for receiving data representing an image, and record means for recording images based on the image read by the read means and the data received by the reception means, said method comprising the steps of:

detecting presence/absence of the original; and controlling the record means such that recording by said record means of the image based on the data received by the reception means is inhibited in response to a detection at said detection step that indicates that the original is present.

46. A computer readable storage medium that stores codes for performing a control method in an image processing apparatus that includes read means for reading an image of an original on an original support plate, reception means for receiving data, and output means for outputting the image read by the read means and an image based on the data received by the reception means, said method comprising the steps of:

detecting open/close operations of a pressure plate which presses the original on the original support plate; and changing over between a first mode and a second mode, the first mode being to output by the output means the image read by the read means, and the second mode being to output by the output means the image based on the data received by the reception means, wherein said changeover step changes between the first mode and the second mode on the basis of a detection result at said detection step.

47. A computer readable storage medium that stores codes for performing a control method of an image processing apparatus, said control method comprising:

a read step of reading an image of an original;

a reception step of receiving data representing an image;

an output step of outputting images based on the image read in said read step and the data received in said reception step;

a detection step of detecting presence/absence of the original; and an inhibition step of inhibiting the output of the image based on the data received in said reception step in response to a detection in said detection step that indicates that the original is present.

48. A computer readable storage medium that stores codes for performing a control method in an image processing apparatus that includes a reader, reception means for receiving data representing an image, and a printer, said control method comprising the steps of:

discriminating whether a physical state of the reader is a first state or a second state;

changing over between a first mode and a second mode, the first mode being to print by using the printer the image based on the image obtained by the reader, and the second mode being to print by using the printer the image based on the data received by the reception means; and controlling a changing operation of said changing step based on a discrimination result at said discrimination step when the reception means receives the data in the first mode.

49. A computer readable storage medium that stores codes for performing a control method in an image processing apparatus having a copying function and a facsimile function, the image processing apparatus including a reader, said control method comprising the steps of:

selectively setting one of a copy mode for performing the copying function and a facsimile mode for performing the facsimile function;

entering a manual instruction;

determining whether the entered manual instruction is for the copy function or the facsimile function, when an original is set in the reader; and controlling a mode set at said setting step based on a determination result at said determination step.

* * * * *

UNITED STATES PATENT AND TRADEMARK OFFICE
CERTIFICATE OF CORRECTION

PATENT NO. : 5,917,616

DATED : June 29, 1999

INVENTOR(S) : FUSANG CHOU ET AL

It is certified that error appears in the above-identified patent and that said Letters Patent is hereby corrected as shown below:

ON TITLE PAGE

[57] ABSTRACT: line 2,

"comprises" should read --comprising--.

COLUMN 2

Line 36, "After then," should read --Then--;
Line 53, "an" should be deleted;
Line 56, "such" should be deleted;
Line 59, "an" should be deleted; and
Line 64, "such" should be deleted.

COLUMN 3

Line 6, "an" should be deleted; and
Line 20, "An another" should read --Another--.

UNITED STATES PATENT AND TRADEMARK OFFICE
CERTIFICATE OF CORRECTION

PATENT NO. : 5,917,616

DATED : June 29, 1999

INVENTOR(S): FUSANG CHOU ET AL

It is certified that error appears in the above-identified patent and that said Letters Patent is hereby corrected as shown below:

<u>COLUMN 7</u>

Line 16, "such" should be deleted; and
   Line 41, "such" should be deleted.

<u>COLUMN 8</u>

Line 14, "if" should be deleted; and
   Line 16, "was" should read --is--.

<u>COLUMN 10</u>

Line 36, "such" should be deleted.

UNITED STATES PATENT AND TRADEMARK OFFICE
CERTIFICATE OF CORRECTION

PATENT NO. : 5,917,616

DATED : June 29, 1999

INVENTOR(S) : FUSANG CHOU ET AL

Page 3 of 6

It is certified that error appears in the above-identified patent and that said Letters Patent is hereby corrected as shown below:

COLUMN 11

Line 20, "such" should be deleted;
   Line 24, "the" should read --an--; and
   Line 58, "such" should be deleted.

COLUMN 12

Line 48, "such" should be deleted.

COLUMN 14

Line 46, "a" should read --is--.

COLUMN 15

Line 32, "such" should be deleted.

UNITED STATES PATENT AND TRADEMARK OFFICE
CERTIFICATE OF CORRECTION

PATENT NO. : 5,917,616

DATED : June 29, 1999

INVENTOR(S) : FUSANG CHOU ET AL

It is certified that error appears in the above-identified patent and that said Letters Patent is hereby corrected as shown below:

COLUMN 17

Line 34, "Such the" should read --The--.

COLUMN 18

Line 18, "times" should read --number of times--.

COLUMN 20

Line 29, "such" should be deleted;
  Line 56, "other" should read --another--; and
  Line 65, "Judged" should read --judged--.

UNITED STATES PATENT AND TRADEMARK OFFICE
CERTIFICATE OF CORRECTION

PATENT NO. : 5,917,616

DATED : June 29, 1999

INVENTOR(S) : FUSANG CHOU ET AL

It is certified that error appears in the above-identified patent and that said Letters Patent is hereby corrected as shown below:

COLUMN 22

Line 1, "so-called a" should read --a so-called--;
   Line 6, "such" should be deleted;
   Line 26, "such" should be deleted;
   Line 27, "such" should be deleted;
   Line 29, "such" should be deleted; and
   Line 32, "the" should be deleted.

COLUMN 27

Line 9, "mean," should read --means,--.

UNITED STATES PATENT AND TRADEMARK OFFICE
CERTIFICATE OF CORRECTION

PATENT NO. : 5,917,616
DATED : June 29, 1999
INVENTOR(S) : FUSANG CHOU ET AL

It is certified that error appears in the above-identified patent and that said Letters Patent is hereby corrected as shown below:

COLUMN 28

Line 29, "mean," should read --means,--.

Signed and Sealed this

First Day of February, 2000

Attest:

Q. TODD DICKINSON

*Attesting Officer*   *Acting Commissioner of Patents and Trademarks*